United States Patent [19]

Sears

[11] Patent Number: 4,769,113
[45] Date of Patent: Sep. 6, 1988

[54] METHOD FOR RECYCLING ENERGY IN COUNTERFLOW HEAT EXCHANGE AND DISTILLATION

[75] Inventor: Stephan B. Sears, Portola Valley, Calif.

[73] Assignee: Superstill Technology, Inc., Redwood City, Calif.

[21] Appl. No.: 38,601

[22] Filed: Apr. 15, 1987

Related U.S. Application Data

[62] Division of Ser. No. 604,023, filed as PCT US82/01191, Sep. 2, 1982, published as WO84/01022, Mar. 15, 1984, Pat. No. 4,671,856.

[51] Int. Cl.$^4$ .......................... B01D 1/28; B01D 3/02
[52] U.S. Cl. .......................................... 203/26; 203/11; 203/71; 203/DIG. 13; 159/24.2; 159/28.6; 202/172; 202/181; 202/182; 202/187
[58] Field of Search .............. 202/180, 176, 172, 173, 202/182, 235, 181, 187; 203/26, 4, 22, 23, 10, 11, 71, 73, DIG. 8, 100, 39, 19, DIG. 13; 159/28.6, 24.1, 24.2, DIG. 31, 47.1, DIG. 27; 165/47, 164, 166, 167

[56] References Cited

U.S. PATENT DOCUMENTS

| | | | |
|---|---|---|---|
| 2,562,739 | 7/1951 | Risberg | 159/28.6 |
| 3,150,028 | 9/1964 | Wennerberg | 159/28.6 |
| 3,155,565 | 11/1964 | Goodman | 159/28.6 |
| 3,190,817 | 6/1965 | Neugebauer et al. | 159/6.2 |
| 3,251,397 | 5/1966 | Lens | 159/28.6 |
| 3,340,186 | 9/1967 | Weyl | 159/DIG. 27 |
| 3,616,835 | 11/1971 | Laurenty | 159/28.6 |
| 3,878,054 | 4/1975 | Rodgers | 159/DIG. 27 |
| 4,124,069 | 11/1978 | Becker | 203/39 |
| 4,341,601 | 7/1982 | Hartig | 203/26 |
| 4,545,862 | 10/1985 | Gore et al. | 159/DIG. 27 |

Primary Examiner—Wilbur Bascomb
Attorney, Agent, or Firm—Flehr, Hohbach, Test, Albritton & Herbert

[57] ABSTRACT

This document describes an improved method and apparatus for recycling energy in counterflow heat exchange and distillation. The basis of the invention is transferring heat with thin sheets of material having extensive surface area relative to the flow rate through the system. A distillation apparatus (11 and 12), a counterflow heat exchanger (11), a clothes dryer (FIG. 9), a power generator (FIG. 12), and other embodiments of the invention are described.

2 Claims, 9 Drawing Sheets

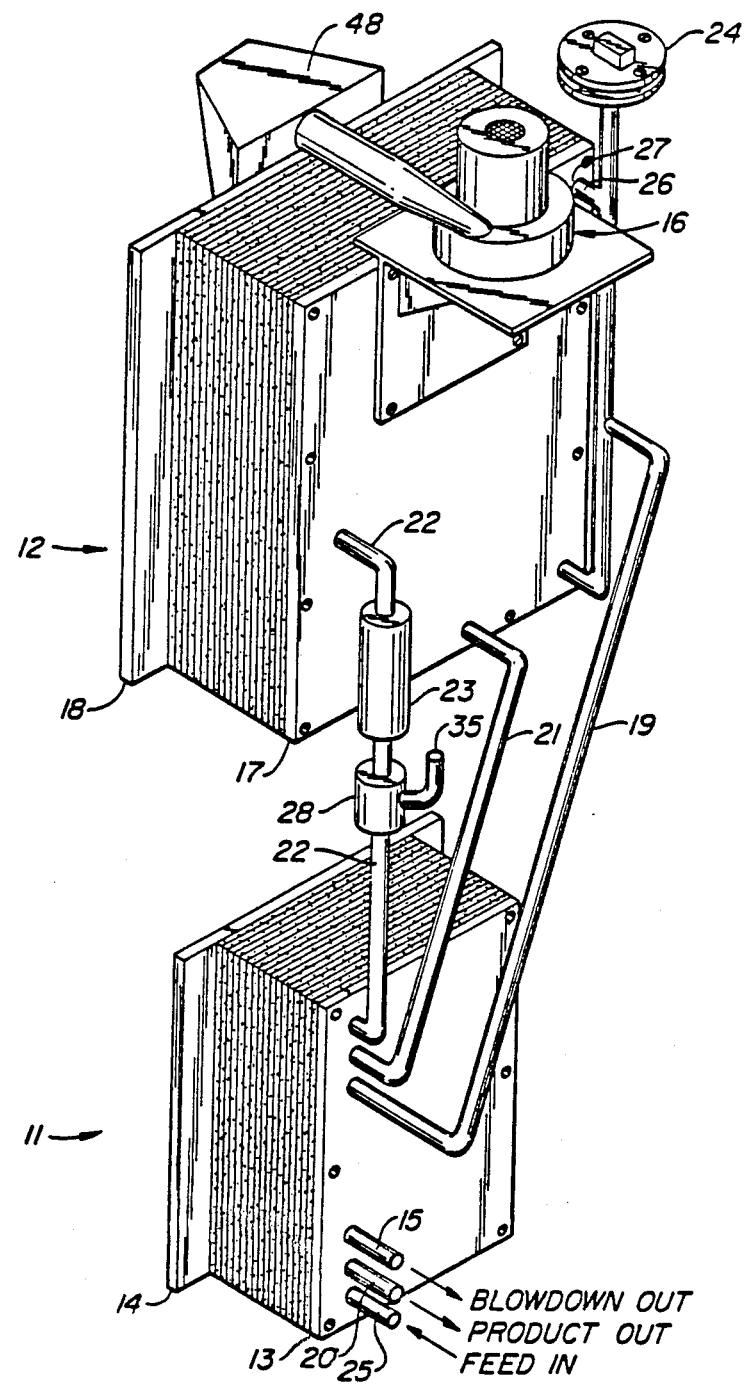
FIG._1.

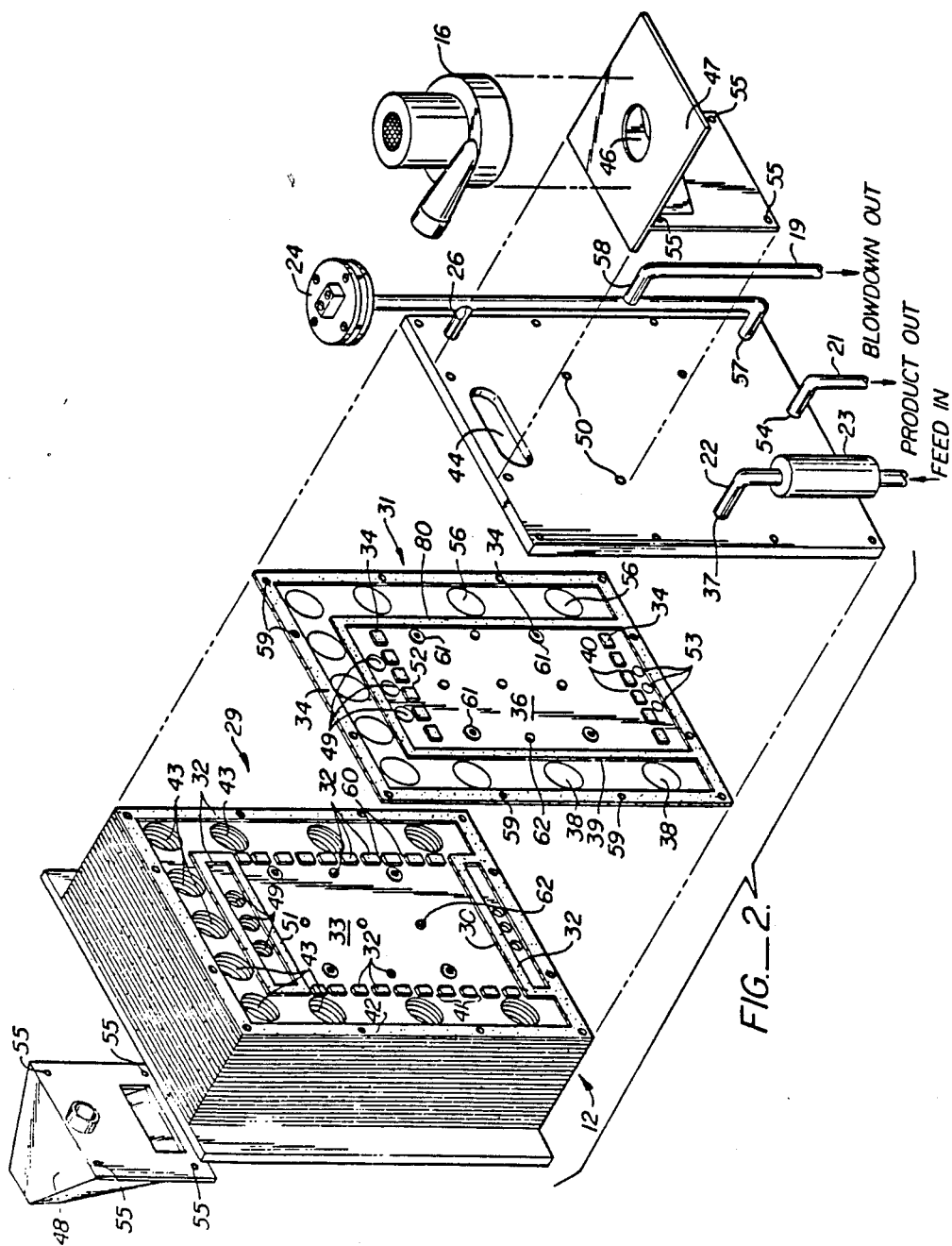
FIG._2.

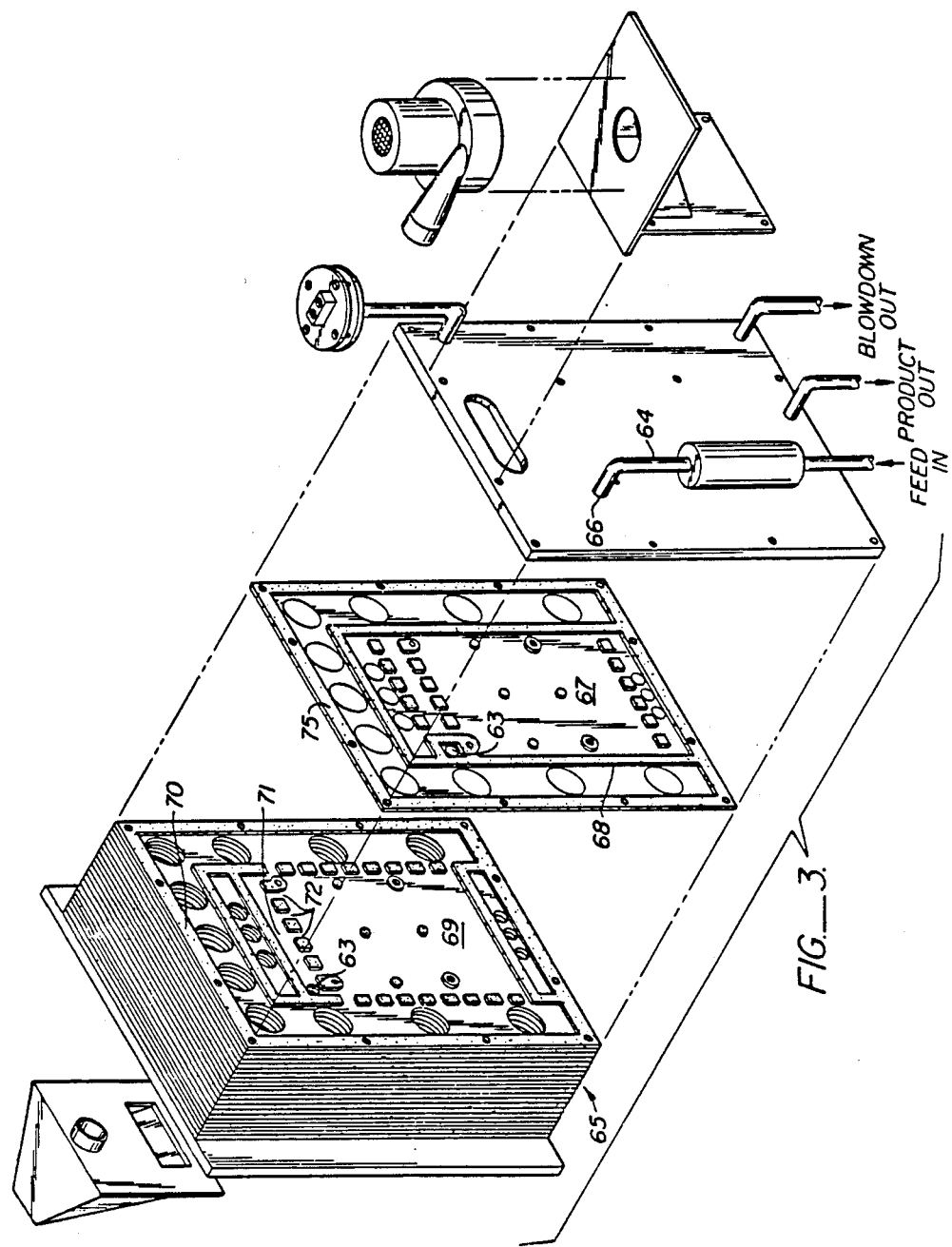
FIG._3.

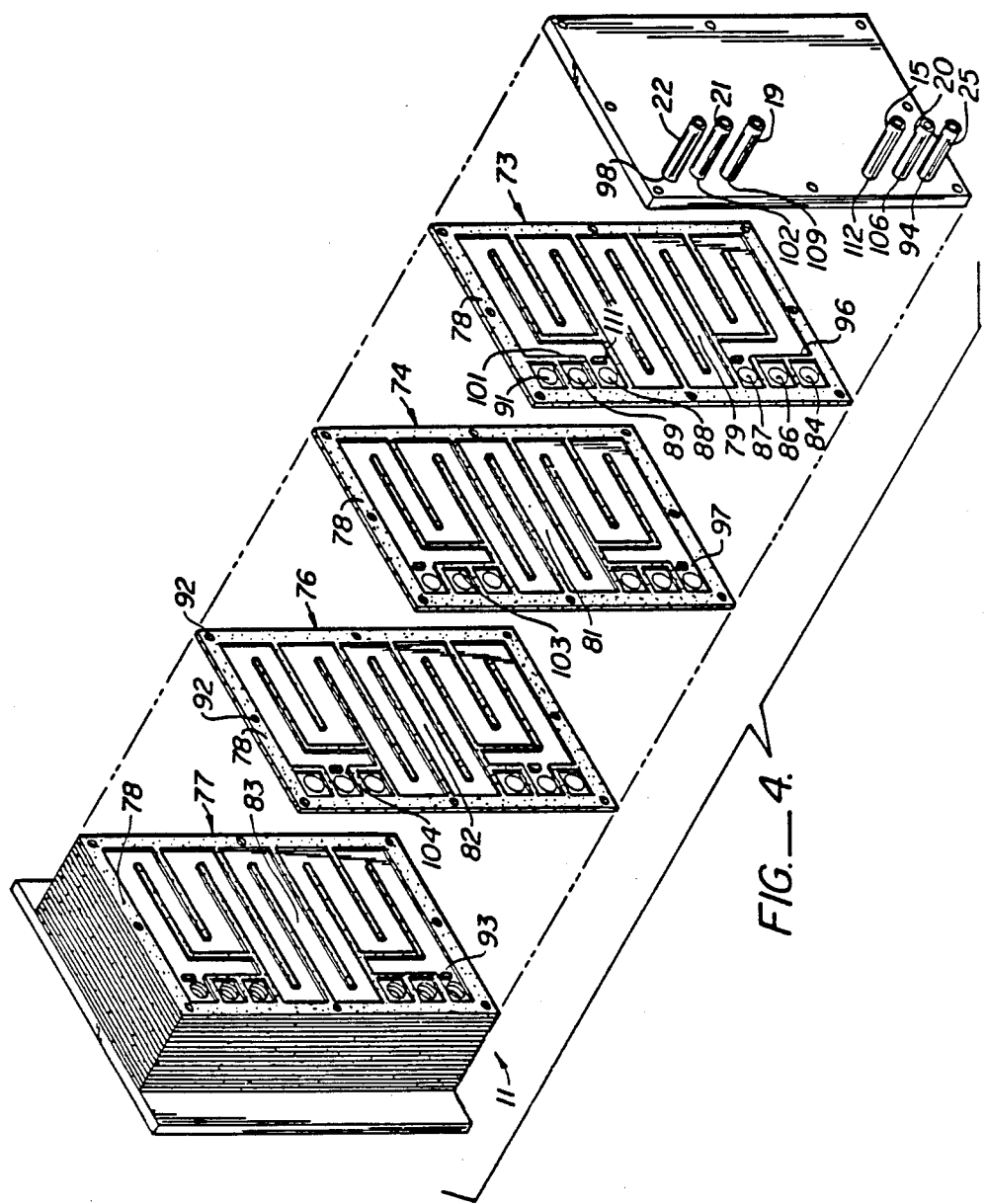
FIG._4.

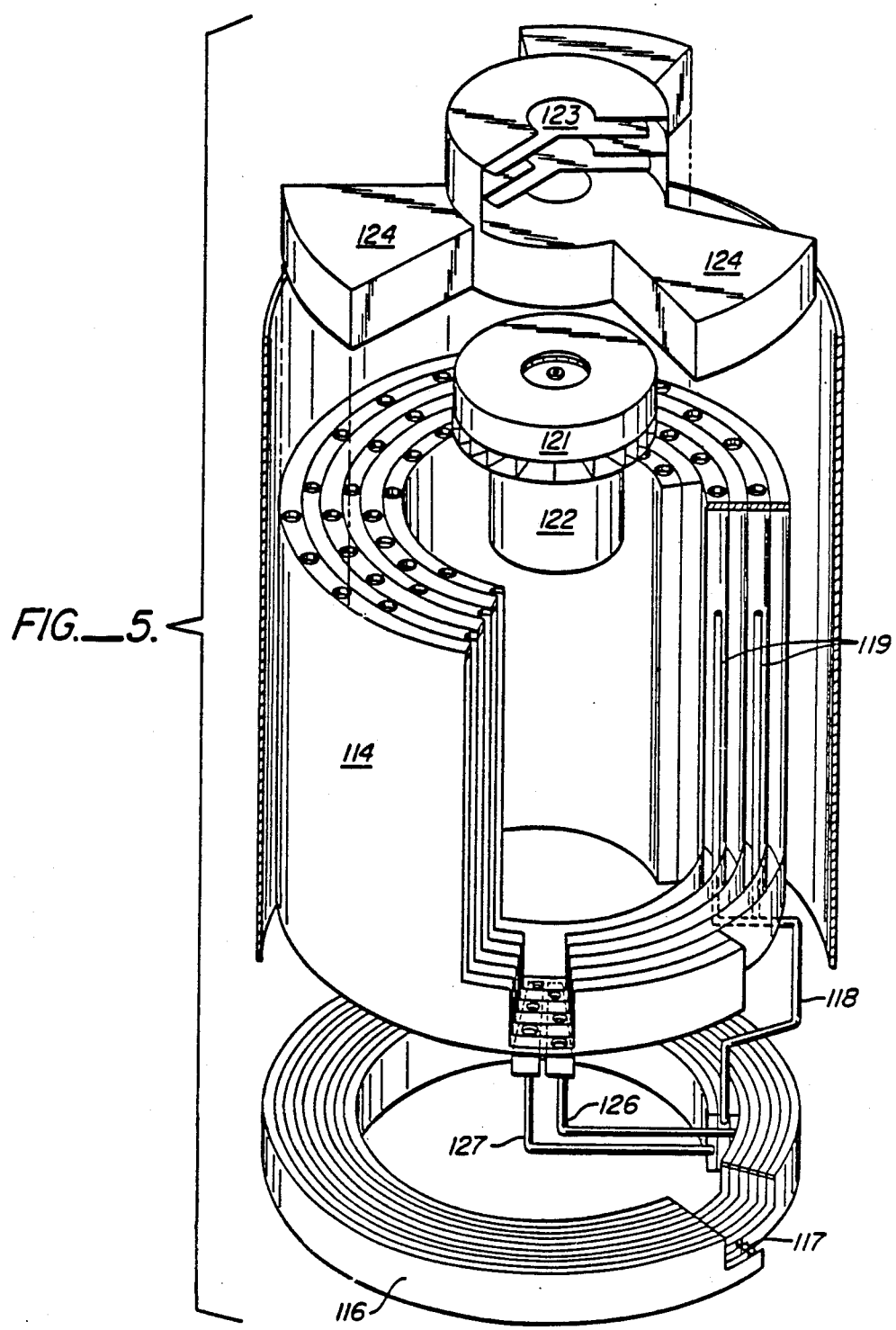
FIG._5.

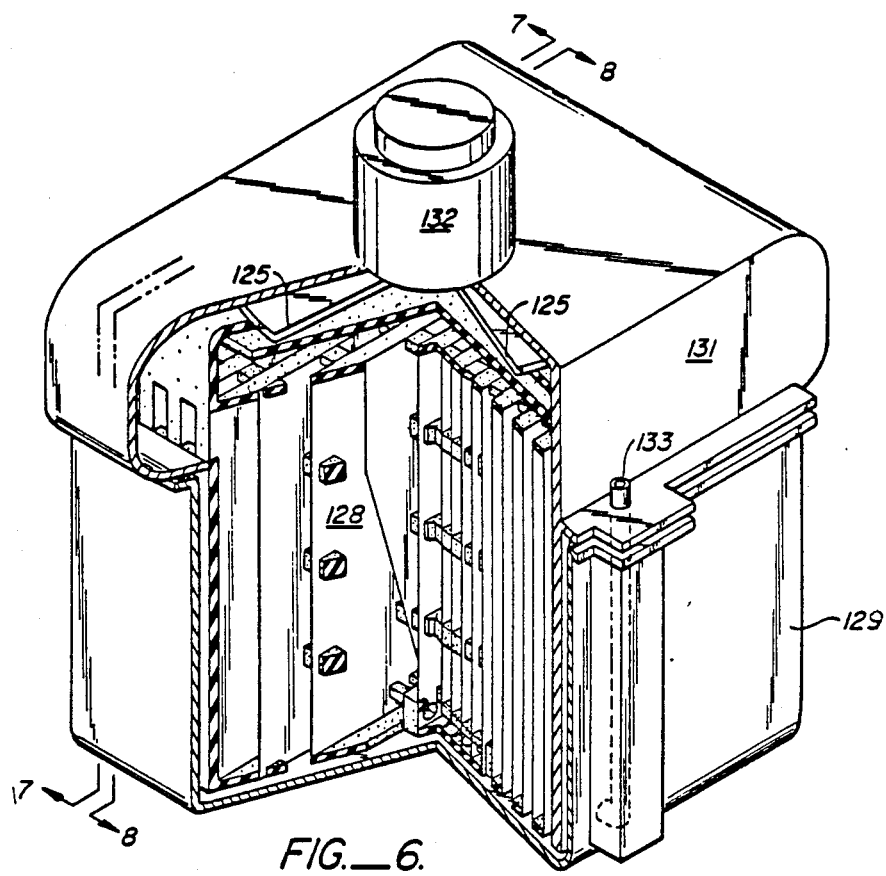
FIG._6.
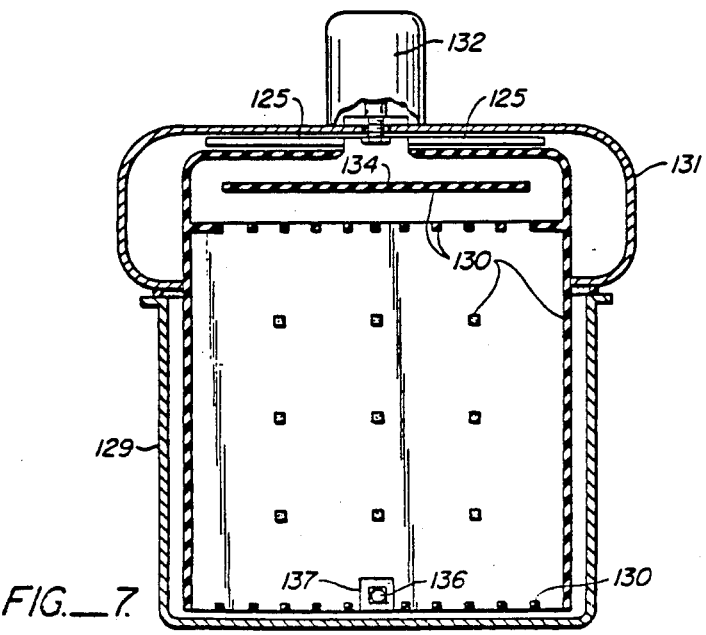
FIG._7.

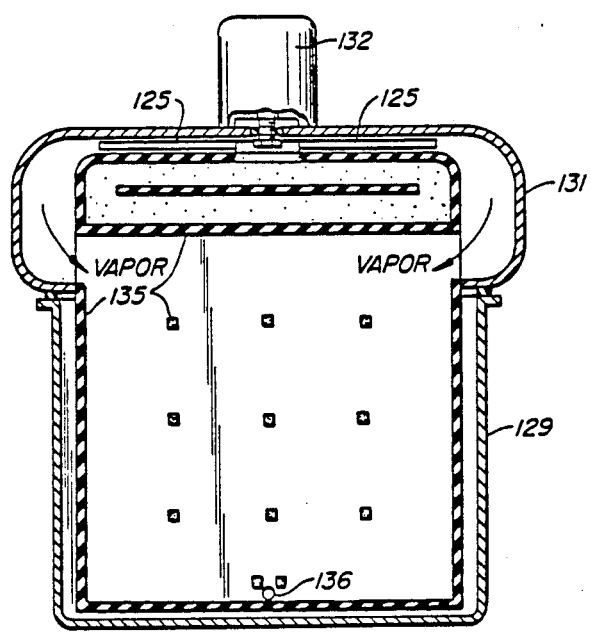
FIG._8.
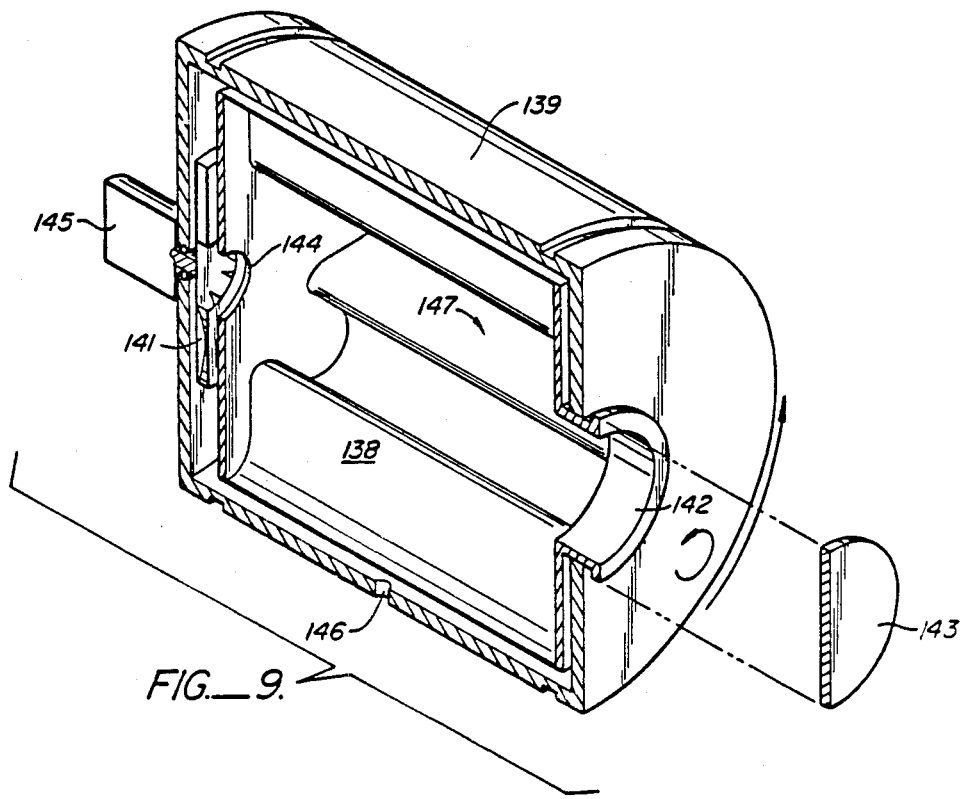
FIG._9.

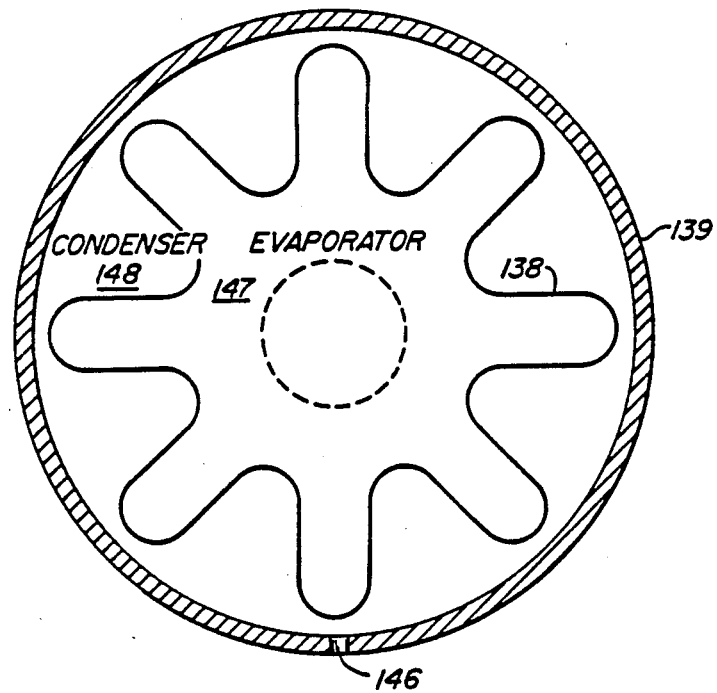
FIG._10.
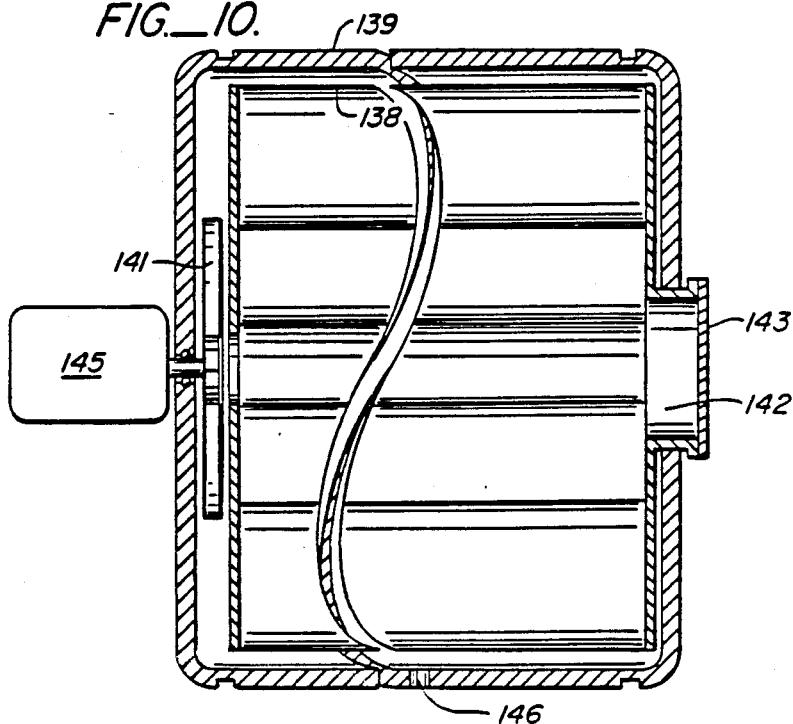
FIG._11.

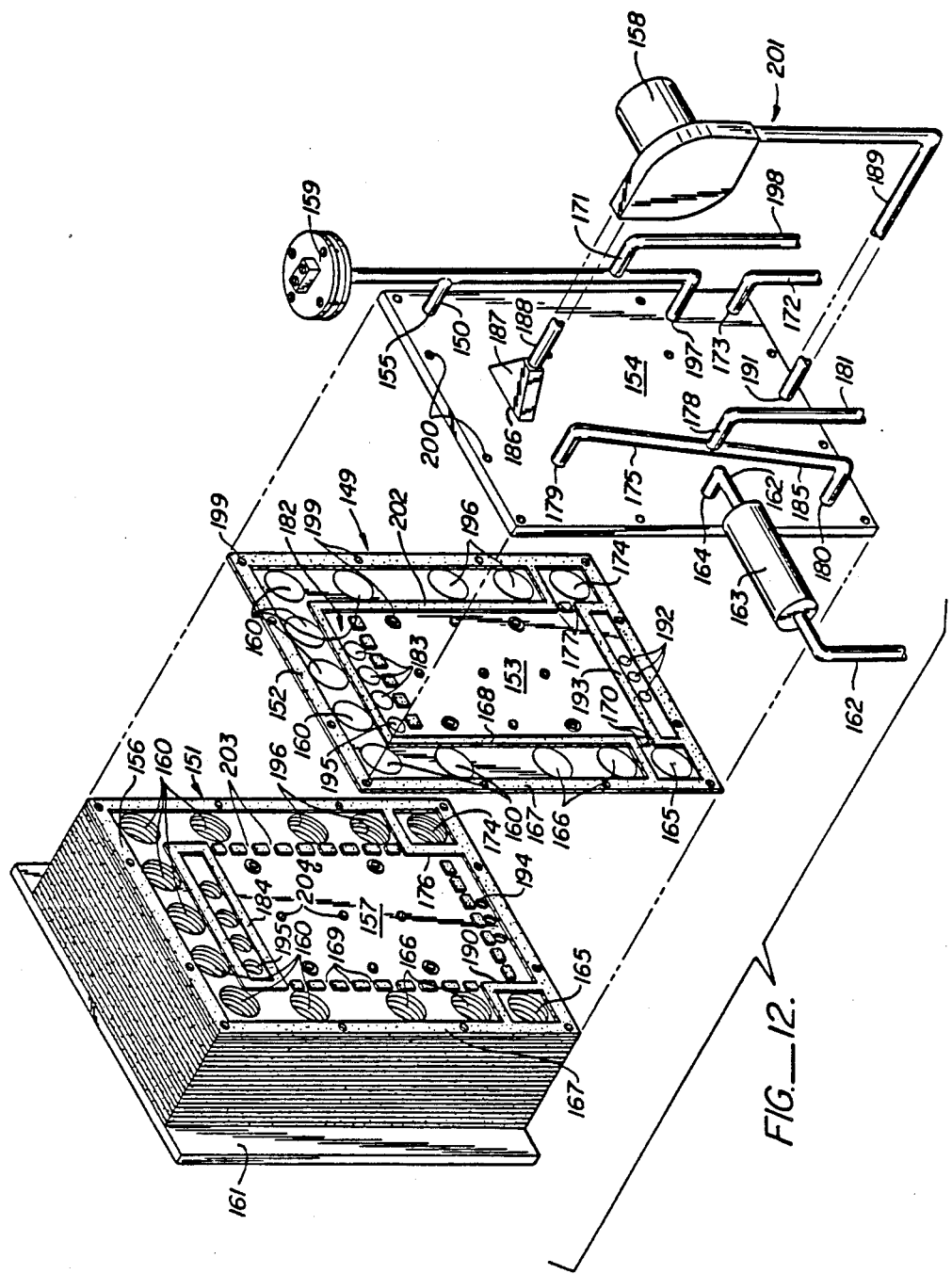
FIG._12.

METHOD FOR RECYCLING ENERGY IN COUNTERFLOW HEAT EXCHANGE AND DISTILLATION

This is a division of application Ser. No. 604,023 filed as PCT US82/01191 on Sep. 2, 1982, published as WO84/01022 on Mar. 15, 1984 now U.S. Pat. No. 4,671,856.

BACKGROUND OF THE INVENTION

This invention is a method and apparatus for heat exchange. Its main applications are in distillation and in counterflow heat exchange. Various models of the invention distill water, distill fuel alcohol, concentrate juices and brines, separate toxic chemicals from industrial wastewater, remove moisture from grains or clothing, exchange heat between liquids, and generate electical power. The fundamental design strategy of the invention is to move heat over a large surface area relative to the flow rate through the system. This background section identifies some of the problems addressed by the invention and describes the conventional solutions.

Water Supply

Global Water Supply

Our planet's ecosystem includes about 326 billion cubic miles (1 trillion, 336 billion cubic kilometers) of water. Only a tiny fraction of this water is available for drinking or irrigation. Ninety-seven percent lies in the oceans, too salty for human life support. Another two and a half percent is frozen in the polar ice caps. For drinking and irrigation we rely almost entirely on fresh water—less than half of 1% of the global water supply. A billion people, or one-fourth of us, lack clean drinking water. Contaminated drinking water is involved in 80% of all human illness and disease, according to the World Health Organization. Gastroenteritis, dysentery, cholera, and other waterborne diseases claim ten million lives each year. The United Nations has declared the 1980's the International Drinking Water and Sanitation Decade and set an ambitious goal: to supply clean drinking water for all people by 1990. To accomplish this goal the United Nations will have to bring new sources of clean drinking water to half a million people each day (on the average) until the end of the decade. Dr. Peter Bourne, U.N. coordinator, has predicted that abundant clean water will "totally revolutionize the life style of rural people in every country of the world."

Water Supply in the United States

The United States draws on groundwater resources and surface water resources in roughly equal measure. Most Americans grew up with plenty of safe, clean water available at the turn of a tap and learned to take it for granted. But our water supply systems show increasing signs of strain. Rivers, lakes, ponds, streams, and other sources of surface water depend on rainfall, and regions involving twenty-eight states were parched by drought in the spring of 1981. New York City declared a drought emergency on Jan. 19, 1981, enacting water restrictions that lasted several months. The city of West Palm Beach rationed drinking water in May of 1981.

Many regions of our country have enjoyed a steady supply of water from vast underground reservoirs called aquifers. The Ogallala aquifer, spanning 800 miles (1280 kilometers), supplies drinking water to communities from West Texas to South Dakota and provides irrigation water for a major agricultural region. Aquifers accumulate over eons—only a tiny fraction of our rainfall seeps into them. In some parts of the American southwest people are drinking groundwater that fell as rain ten thousand years ago.

We're pumping water out of our aquifers a billion gallons a day faster than rainwater is seeping into them. We're mining a precious resource, and in many places the lode is running dry. In California's San Joaquin Valley an area the size of Connecticut has sunk as much as 30 feet (9.1 meters) in the last twenty-five years because of excessive groundwater removal. Overuse of groundwater threatens the existence of midwestern agriculture. "It varies, depending on where you are, but there are some people projecting that as early as the year 2000 there will be parts of Nebraska with their water supplies so depleted that farming may never return" according to Michael Jess, Nebraska water planner (Newsweek, 2/23/81). In May 1981 in Winter Park, Fla. the earth caved in, swallowing part of the city and creating a circular chasm 400 feet (121 meters) wide and 100 feet (30 meters) deep. Underground limestone caverns collapsed to create this huge sinkhole. When too much water was removed the limestone became brittle and crumbled.

Water Supply in American Coastal Cities

Our major coastal cities, like inland areas, rely on fresh water. Purification of ocean water is rarely attempted. New York City draws water from reservoirs in the Catskill Mountains 125 miles (200 kilometers) to the northwest, then delivers this water to citizens with a highly centralized distribution system. Within the city all the water for eight million people rushes through two immense underground waterways known as City Tunnel #1 and City Tunnel #2. Built in 1917 and 1936, these tunnels have operated continuously ever since. They lie as far as 800 feet (243 meters) below the ground and provide no access for maintenance or inspection. Maurice Feldman, a former New York City water commissioner, has predicted that the tunnels will collapse within ten to forty years. In 1970 the city began digging a third tunnel 60 miles (96 km) long and 24 feet (7 meters) in diameter, blasted out of solid rock and lined with concrete. New York City's financial crisis interrupted construction in 1975. At that time the Army Corps of Engineers estimated that the city water pipes were leaking 100,000,000 gallons (4,400,000,000 liters) a day, the rate of water consumption in San Francisco. Construction resumed in 1977. Current estimates of the total cost of building City Tunnel #3 range from five to ten billion dollars.

Los Angeles, too, imports fresh water by mammoth feats of engineering rather than purifying ocean water. Residents of Los Angeles rely on the Owens Valley 340 miles (544 km) to the north and the Colorado River 240 miles (384 km) to the east. Removal of water from the Owens Valley caused Mono Lake to drop 44 feet (13.4 m) since Los Angeles began drawing water from its tributary streams in the 1920's. Until 1981 tens of thousands of migratory birds nested at Mono Lake and fed on brine shrimp from the lake's salty waters. But as the lake drained its salinity increased, and it became too salty for brine shimp to survive. Without an adequate food source, virtually all the California Gull chicks hatched at Mono Lake in 1981 died. A recent congressional bill that would make Mono Lake a national park has jeopardized the flow of water from the Owens Valley to southern California.

Three fourths of the water used in Los Angeles and San Diego comes from the Colorado River. Nearly a third of the power generated by Hoover Dam is used to pump Colorado River water through enormous canals, tunnels, and aqueducts to the deserts and coastlines of southern California. The Colorado is the only major source of surface water in the southwest—residents of Colorado, Utah, and Arizona also rely on it. In 1985 the Central Arizona Project will begin transporting Colorado River water eastward across three hundred miles of desert to Phoenix and Tucson. California's allotment will diminish by about 20%, or 325 billion gallons (1.4 trillion liters) per year. Southern Californians may face stringent water conservation measures unless they can find another source of water.

Water Pollution

Problems of water scarcity are intensified by pollution of our fresh water supplies. Trihalomethane gases, known to cause cancer in laboratory animals, contaminate virtually all our drinking water as a result of the chlorination process city water systems use to prevent the spread of waterborne diseases. Trihalomethanes form when chlorine interacts with algae, microorganisms or other organic materials in the water. Other contaminants originate in the delivery system—lead and asbestos from water pipes leach into our tapwater.

Pollutants are also contaminating groundwater. Salt thrown on icy roadways has worked its way into aquifers in New England—residents of several Massachusetts communities receive notes with their water bills warning them that the sodium content of their tapwater is dangerously high and advising them to drink bottled water. More than 600 wells in the New York City area have been closed during the past three years due to chemical contamination. Wells providing half the drinking water for residents of Atlantic City, N.J. are in imminent danger of contamination by a huge plume of toxic chemicals dumped over a decade ago. In California's San Joaquin Valley, where 80% of the people rely on wells for drinking water, many wells are being shut down because they contain a highly toxic pesticide known as DBCP (dibromochloropropane). Agricultural pesticides and industrial solvents such as trichloroethylene, dioxane, and benzene had entered groundwater in at least 250 sites as of September 1980, according to a report by the House Govenment Operations subcommittee. There are more than 50,000 hazardous waste dumps in the United States—no one knows how many of them are leaking toxic chemicals into our water supplies. Once groundwater is contaminated it's likely to stay contaminated for hundreds, even thousands of years.

Water Distillation

For thousands of years people have respected distillation as a perfect separation technique for purifying water. Distillation involves boiling the water, moving its vapors to a different location, and condensing the vapors to obtain pure water. Aristotle (384 B.C.) mentions the evaporation of salt water to obtain fresh water. Alexander of Aphrodisias (circa 100 B.C.) tells of sailors boiling seawater and hanging sponges in the steam to collect pure water for drinking. The individual water vapor molecules rising from the boiling seawater have no way to carry off the salt—the steam is pure water vapor. The main problem with distillation is the extremely high amount of energy it takes to boil water.

Home Water Stills

Some people purify their tapwater with a home distillation apparatus known as a still. Conventional tapwater stills consist of a boiling chamber, a condensing chamber, and an electric heater. The heater boils the impure water. Steam travels to the condensing chamber and condenses, becoming distilled water. These stills remove any solid pollutants that contaminate our drinking water: asbestos or lead from decomposing water pipes, salt thrown on icy roadways, arsenic or cadmium from industrial wastewater. But most tapwater stills won't remove toxic gases or liquids—these bubble off with the steam and contaminate the product water.

The cost of operating tapwater stills limits their usefulness. They don't recycle energy. The electric heater has to supply all the energy for heating and boiling the water—2.8 kilowatt hours per gallon. At 11 cents per kilowatt hour, energy for distillation costs thirty-one cents per gallon (seven cents per liter). Most home stills can purify ten gallons (44 liters) of water a day, enough for drinking and cooking for a small family. The energy to distill that much water costs $92.00 per month. It would be advantageous to purify 200 gallons (880 liters) of water a day for bathing, showering, washing clothes, and washing dishes. But conventional stills with such a large output are huge and expensive, and the energy to run them costs over $1800 a month.

Conventional Seawater Stills

The abandoned desalting plant in Fountain Valley, Calif. exemplifies the American experience with seawater purification. Built in 1975 at a cost of $14 million, the plant was designed to distill fifteen million gallos (66 million liters) of pure water per day, operating around the clock. But neighbors complained that the noise from its boilers was intolerable and succeeded in shutting the plant down at night. The plant produced only three million gallons (13 million liters) per day but consumed all the energy its designers expected it would need for the full fifteen million. After nine months of operation the government decided the plant was too expensive to operate and shut it down. Today pigeons roost there, using its insulation to build nests along the catwalks. Similar stills in Chula Vista, Calif. and Freeport, Tex. were sold for scrap.

Vapor Compression Distillation

Some large-scale seawater stills reduce the cost of distillation by recycling energy. One energy-recycling process is known as vapor compression distillation (Holden, U.S. Pat. No. 3,423,293). The goal of this process is to boil the seawater with heat given by the steam when it condenses. (When the steam condenses it returns all the heat that went into boiling it off.) To recycle this heat, vapor compression stills compress the steam so it will condense in metal tubes which contact the boiling seawater. The heat released by the condensing steam flows through the tube walls into the boiling seawater to generate more steam. The condensed steam, now distilled liquid water, passes through a counterflow heat exchanger to heat up the incoming seawater.

By recycling energy this way vapor compression stills reduce the energy requirements for distilling a thousand gallons (4.4 thousand liters) of seawater from 2800 kilowatt hours to 75 kilowatt hours, lowering the cost from $196 to $5.25 (assuming industrial rates of 7 cents per kwh). From an enginering standpoint that's a remarkable accomplishment. But from a practical standpoint it's still too expensive. If Los Angeles used conventional vapor compression stills to purify enough Pacific Ocean water to replace the Colorado River water it will lose to Arizona in 1985, the cost of energy alone would come to $5 billion in just three years.

People resort to seawater distillation only in extreme circumstances. Kuwait, an Arab nation rich in oil revenues but virtually devoid of fresh water, relies almost entirely on desalted water. All the desalting plants in the world produce a total of a billion gallons (4.4 billion liters) of pure water a day, approximately the rate of water use by people in the Los Angeles basin.

Reasons for the Inefficiency of Vapor Compression Stills

Vapor compression stills are inefficient because the tubes which transfer heat from the condensing steam into the boiling seawater don't have enough surface area. Many factors limit the available surface area. Tubes are expensive to build and expensive to buy. They usually must be welded along one seam and at both ends. It's impractical to pack the tubes too densely because all the tubes must be accessible for periodic cleaning, and tubes welded in the center of complicated tube bundles are difficult to clean. With a limited area for condensing, the steam has tended to condense slowly.

The only way to condense the steam faster with limited surface area has been to compress it substantially—and high compression creates a multitude of problems. Most important, high compression requires substantial energy. High compression demands bigger, more expensive, less efficient compressors and thicker, more heat resistant tubes. Compressing the steam substantially makes the tubes much hotter than the seawater, creating a violent boiling action that wastes energy in turbulent motion of the water. A vapor barrier forms on the hot tubes and interferes with their ability to transfer that into the water. All these factors reduce efficiency in conventional vapor compression stills.

Similar problems plague the counterflow heat exchange process which these systems use to heat up the cold seawater. To prevent heat exchangers from being massive and expensive the universal design strategy has been to move heat through a small area by forcing the liquids through their channels under high velocities and high pressures and by agitating the liquids to create a turbulent flow pattern. This approach presents many problems. High velocities and high pressures require a lot of energy. High pressures demand that the metal walls transferring heat be relatively thick to withstand the stress. The thicker the walls, the more they resist the flow of heat. The turbulence of the water dissipates energy. These factors reduce efficiency and increase the cost of the process.

The high operating cost of conventional seawater stills reflects their inefficiency. Scientists have long known of the theoretical possibility of a more efficient process. Weinberg wrote in the Bulletin of the Atomic Scientists (26, 6, 69, 1970): "Theoretically, about 3 kilowatt hours of work are required to separate the 300 pounds of salt which are contained in 1000 gallons of seawater. If energy is available at, say, five mills per kilowatt hour, then the thermodynamic minimum cost of desalinating seawater would be 1.5 cents per thousand gallons. Of course this minimum can never be attained." In other words, the work which costs $5.25 with conventional vapor compression stills can theoretically be done for twenty-one cents at today's industrial rates of seven cents per kilowatt hour. The other $5.04 derives mainly from the inefficiency of the stills.

The inefficiency of conventional seawater stills is the main reason why ocean water is essentially unavailable for human life support. In the drought year of 1981 not one sizable American metropolitan area purified seawater for drinking. Not one acre of American farmland is irrigated with purified seawater. Distilling seawater requires too much energy.

Energy Supplies

Global Energy Supplies

Every day the sun showers the earth with 400 trillion kilowatt hours of solar heat, 25,000 times more energy than people consume as fuel and electricity. Instead of deriving fuel and electricity from this daily income of solar energy, we rely on our planetary savings account of fossil fuels—petroleum, coal, and natural gas. These fuels formed as plants collected solar energy, stored it as chemical energy, then lay inside the earth under high pressures for millions of years. Much of the petroleum has already been burned. The remainder can last only a few more decades at current rates of consumption.

Basing our world energy system on fossil fuels creates many immediate problems. The price of oil has skyrocketed from $1.50 a barrel in the 1960's to $32.00 today. The United States pays a billion dollars a week for imported oil. Countries such as Chad, Ethiopia, Nepal, Burma, Burundi, Upper Volta, and India, having a per capita gross national product of less than $200, can't afford oil and are blocked in their efforts to achieve a higher standard of living by a shortage of energy. Mining the fossil fuels is hazardous—deep mining of coal impairs human health, strip mining of coal disfigures the environment, oil spills destroy marine life. Burning fossil fuels causes contamination of the earth's atmosphere.

Power Generation

In the United States we produce 90% of our electricity in power stations which burn fossil fuels. These power stations consist of three main elements: a boiler, a condenser, and a turbine. The burning fuel boils water to generate a head of steam. As the steam expands from the boiler to the condenser it spins turbine blades. Electrical generators convert the rotary motion of the turbines into electricity.

These power stations are fraught with many difficulties apart from their dependence on expensive fuel supplies. They are enormously inefficient—they discharge more energy into the environment as waste heat than they convert into electricity. A conventional coal-fired plant burns 500,000 pounds (226,500 kilograms) of coal per hour to produce 1,000 megawatts of electricity (enough to supply a million people) and 1,300 megawatts of waste heat. Furthermore, a coal-fired plant this size discharges 28,000 pounds (12,684 kilograms) of pollutants per hour into the atmosphere. Acid rain caused by pollutants from midwestern power plants has killed all the fish in more than two hundred lakes in the Adirondack Mountains of New York, once a favorite resort area.

Nuclear Power Stations

Nuclear power plants now supply 4-5% of our nation's electricity. Like power plants fired by coal or petroleum, nuclear power stations boil water to generate steam for spinning the blades of a turbine. Several factors limit the viability of nuclear power. One by-product of nuclear power plants is plutonium, a man-made element 20,000 times more poisonous than cobra venom. Plutonium must be stored for hundreds of thousands of years before humans can handle it safely. Someone with 20 pounds (9 kilograms) of plutonium could make an atomic bomb with information from unclassified publications. Another factor weighing against nuclear power plants is the phenomenal cost of building them. In February 1982 two nuclear plants under construction near Satsop, Wash. were scrapped. They were going to cost at least $23 billion—four times the cost their buyers expected when construction began. In 1980 sixty-nine nuclear construction projects were delayed and sixteen others cancelled in the United States, most of them victimized by high costs and steep interest rates.

Fuel Alcohol

Alcohol is an ideal universal fuel, appropriate for powering automobiles, heating buildings, or any other process now burning petroleum, coal or natural gas. Alcohol fuel is solar energy, collected and transformed into chemical energy by plants. Plants use the energy of sunlight to build large sugar molecules from carbon dioxide and water. When the plants ferment under proper conditions the sugar breaks down into carbon dioxide and alcohol. When the alcohol burns, energy is released.

Alcohol has received widespread appreciation as a high-grade motor fuel. When Otto invented internal combustion engines in Germany in the nineteenth century has prototypes burned alcohol. Henry Ford advocated the use of "power alcohol" to stimulate agriculture and capitalize on a renewable resource—he equipped his Model T's and some later cars with adjustable carburetors to accommodate either alcohol or gasoline. Before World War II forty countries were blending alcohol into gasoline. Detroit built cars for the Phillipines and New Zealand that ran on straight alcohol.

Gasoline became the conventional motor fuel because it was readily available at low cost. But as petroleum becomes scarce and expensive more countries are turning to alcohol distilled from farm commodities as a fuel for motor vehicles. Brazil has begun a major program to eliminate oil imports entirely by running all its cars and industries on alcohol distilled from homegrown sugar cane and manioc. (Manioc is a starchy plant whose roots are a valuable food product. It is the source of tapioca.) Governments of New Zealand, Australia, South Africa, Thailand, Kenya, the Sudan, the Dominican Republic, Guyana, and Jamaica are considering large-scale alcohol fuel production.

Science magazine (1979, Volume 195) and many other sources indicate that alcohol delivers more power and better mileage than gasoline while burning cooler and quieter. Most cars can run on alcohol with only minor adjustments to their carburetors. A professional race car driver, Bobby Unser, testified before Congress recently that he has burned alcohol in his race cars for years and that he finds it "a lot safer, a lot nicer to work with than gasoline." Alcohol is safer because it doesn't burn explosively at normal atmospheric pressure. If spilled in the ocean alcohol has no toxic effects.

Alcohol burns clean—converting all American automobiles to alcohol would reduce air pollution in this country by 90%, according to Stanford Research Institute (now SRI International). The waste products of engines burning alcohol are carbon dioxide and water vapor. These are also waste products of human beings. Engines burning alcohol in a closed room won't asphyxiate people.

Some writers have expressed concern that emissions from engines burning alcohol will cause a dangerous buildup of carbon dioxide in the atmosphere. Actually, alcohol-burning engines release the same amount of carbon dioxide the plants absorbed from the atmosphere to build the sugar molecules that produced the alcohol. In this sense, automobiles burning alcohol maintain a harmonious balance with nature.

Alcohol is as renewable as sunlight, and people can produce it almost anywhere. In a September 1980 report entitled "Alcohol from Biomass in the Developing Countries" the World Bank offered the opinion that alcohol is the main renewable energy source developing countries can produce from their own resources. The World Bank expressed interest in helping to design national alcohol programs.

Alcohol Distillation

Fuel alcohol must be distilled because when plants ferment they yield only 5% to 15% alcohol—the rest is water. Fuel mixtures require at least 75% alcohol. Since alcohol evaporates more readily than water, the two can be separated by distillation. Alcohol producers have borrowed intact the stills of the beverage industry, consisting of metal columns 30 to 60 feet (9 to 18 meters) high filled with packing material. Alcohol and water vapors condense and re-evaporate many times on the packing material as they rise through the column. The vapors become richer in alcohol as they reach the top.

The widespread use of alcohol fuel is restricted by the energy requirements of distillation. Column stills require approximately 45,000 British Thermal Units (12.6 kwh) of energy to distill one gallon (4.4 liters) of 100% alcohol fuel. A gallon of alcohol has a fuel value of 84,000 BTU (24.6 kwh). Burned in a 15% efficient internal combustion engine, it can accomplish only 14,000 BTU (4.1 kwh) of useful work. It takes more energy to distill alcohol than you can be back when you burn it. That's why alcohol is known as an "energy loser."

Column stills were designed for distilling alcoholic beverages in the early nineteenth century when energy was cheap and whiskey was expensive. They require too much energy to produce fuel economically today. The main source of their inefficiency is this: after the distilled alcohol vapors leave the top of the columns, the heat they yield in condensation doesn't get recycled. This heat is lost to the process. All the heat for boiling comes instead from steam produced in boilers fired by petroleum, coal, or natural gas.

Fuel Alcohol U.S.A., a monthly magazine devoted to the alcohol fuel industry, reported in February 1982 that 160 proof alcohol (80% alcohol, 20% water) is an excellent automotive fuel, superior in performance and economy to straight alcohol. Distilling 160 proof alcohol fuel requires only half as much energy as distilling straight alcohol. Even so, it's not clear that alcohol fuel production can be economical.

Distillation has earned a reputation as a problematic technology, capable of making many contributions to human society but too energy-intensive to realize its potential value.

SUMMARY OF THE INVENTION

The invention distills liquids with little energy because it recycles energy efficiently. In essence this invention is a heat transfer technology. It recycles energy to reduce the costs of many domestic and industrial processes. The key to its efficiency is transferring heat over an extensive surface area. This section briefly describes the main embodiment of the invention, discusses various applications, and explains how the invention solves the problems discussed in the background.

BRIEF DESCRIPTION OF THE MAIN EMBODIMENT

The Distillation Process

Distillation is a process of evaporation and condensation. The feed liquid enters a boiling chamber, where part of its boils off. Vapors travel to a condensing chamber and condense, becoming the product, or the distilled liquid. The part of the feed liquid that doesn't boil off becomes concentrated. This concentrated liquid, known as the blowdown, carries impurities out of the boiler. The invention recycles energy at two points: first to heat the cold feed liquid to its boiling point, then to boil it.

In water distillation about 1200 BTU per gallon (1.5 kwh per liter) are required to heat the feed water from 60° F. (16° C.) to 212° F. (100° C.), its boiling point. The product and the blowdown give off the same amount of energy, 1200 BTU per gallon (1.5 kwh per liter), when they cool from 212° F. to 60° F. (from 100° C. to 16° C.). The invention transfers heat from the product and the blowdown into the feed water.

After the feed water reaches its boiling point, about 8000 BTU (2.3 kwh) of heat energy are required to convert a gallon of it to steam. The steam gives back 8000 BTU (2.3 kwh) when it condenses. The invention transfers heat from the condensing steam into the boiling water.

The Hardware

A counterflow heat exchanger transfers energy from the hot product and the hot blowdown into the cold feed liquid. The counterflow heat exchanger is built by stacking thin sheets of stainless steel with gaskets to form channels for the liquids. Every sheet transfers heat from hot liquid flowing in one direction on one side into cold liquid flowing in the opposite direction on the other side.

A boiler-condenser unit called a core transfers energy from the condensing vapors into the boiling liquid. The core is built by stacking thin sheets of stainless steel with gaskets to form an alternating sequence of boiling chambers and condensing chambers. Heat from condensing vapors flows through the sheets to boil the liquid on the other side.

A compressor raises the pressure of the vapors so they will condense and give up their energy. The work of the compressor yields a multiplier—the input energy for compressing the vapors allows you to recycle more than 100 times that much energy from the condensing vapors back into the boiling liquid.

The Design Strategy

The design strategy of this invention is to transfer heat over an extensive surface area—at least two square feet for every gallon per hour of fluid passing through the system (0.8 square meters per liter per hour). This strategy makes low-energy distillation possible for the first time. In water distillation the invention recycles more than 99% of the energy for heating and boiling the water. Less than 1% of the total energy for distillation must be added continuously from an external source. The next two paragraphs explain how extensive surface area leads to efficiency in the counterflow heat exchanger and the core.

Extensive Surface Area and Gentle Liquid Flow in the Counterflow Heat Exchanger

When the liquids communicate over an extensive area, they exchange heat readily even when they flow gently—with low velocities, low pressures, and a laminar or regular flow pattern. Passing the liquids through their channels gently is a novel procedure offering many advantages. First, the liquids require little input energy to move through their channels. Since the liquids place little stress on the heat transfer sheets, the sheets may be very thin. Thinner sheets conduct heat better, contain less material, weigh less, and cost less, and fewer of them are needed for a given rate of heat transfer. The gentle movement of the liquids dissipates little energy in turbulence, and also allows the heat transfer sheets to be stacked very close together. Close spacing of the sheets places the hot liquids and the cold liquid in intimate contact for optimal heat transfer. This gentle approach results in a compact, inexpensive, efficient counterflow heat exchanger. The energy transferred from the hot liquids to the cold liquid may be 800 times greater than the input energy required to move the liquids through the heat exchanger.

Extensive Surface Area and Low Compression in the Core

When the condensing vapors are placed in heat exchange relationship with the boiling liquid over a large area, the vapors condense readily with a very small compression step. Compressing the vapors a minimal amount is a novel approach to distillation offering many advantages. Little energy is required to compress the vapors. Since the compressed vapors exert little force on the heat transfer sheets, the sheets may be very thin. Low compression also makes it possible to stack the sheets very close together for efficient heat transfer. In addition, standard inexpensive compressors of simple construction may be used. The cumulative effect of this strategy is a compact, inexpensive, efficient boiler/condenser unit. The energy transferred from the condensing vapors to the boiling liquid may be 100 times greater than the input energy required to compress the vapors.

Manufacturing Techniques

This invention is relatively easy to manufacture. The basic construction technique is simply stacking sheets of metal with gaskets and then bolting them together. The modular design of the invention makes it appropriate for any scale—many sheets form a large unit, a few sheets form a small one. The heat transfer sheets are so thin they may be constructed from materials which are not particularly heat conductive such as glass or plastic, both of which are plentiful and inexpensive.

Maintenance

The owner can perform all routine maintenance of the invention with common tools. To gain access to the heat transfer sheets for periodic cleaning one simply removes the bolts which hold them together.

Applications of the Invention

In some applications of this technology the object of the boiling and condensing process is to collect the substance that boils off. This is true, for example, in purifying water and distilling alcohol. In some other applications the object is to collect the part that doesn't boil off. This is true in drying grains, drying clothing, and concentrating or dehydrating solutions. In a third type of application, the invention uses steam to generate electrical power, a novel capability for a distillation apparatus. In all these situations the invention recycles heat efficiently. The remainder of this section will discuss some of its applications.

Water Purification

A device slightly larger than a microwave oven will purify 15 gallons (66 liters) of tapwater per hour while drawing less than 1 kilowatt of power. It removes all pollutants—solids, liquids, or gases. Its energy costs for distilling ten gallons (44 liters) per day come to less than $3 a month (at 11 cents per kilowatt hour). With this invention the energy to purify two hundred gallons (880 liters) of water a day would cost only $44 a month. The invention also makes it economically feasible to purify and recycle household wastewater during droughts or in areas of fresh water scarcity.

Larger units will enable municipal water districts to remove toxic chemicals from drinking water supplies. This invention will purify a thousand gallons (4.4 thousand liters) of fresh water while drawing only two kilowatt hours of energy, at a cost of 14 cents (assuming industrial rates of 7 cents per kwh). The invention will also prevent the formation of trihalomethane gases by removing the organic materials in the water before chlorine is added. After the water has been distilled, only trace amounts of chlorine will be needed to keep it pure.

Many industries will value this invention because it can extract toxic chemicals inexpensively from their wastewater, so both the chemicals and the water can be recycled. The industrialized countries water recycling will significantly reduce environmental pollution. In developing countries the ability to recycle water inexpensively will facilitate industrial development, since industries will not be dependent on vast water resources.

The invention also gives inexpensive access to pure water from the oceans. In large-scale settings this invention will purify a thousand gallons (4.4 thousand liters) of ocean water for 6 kilowatt hours, the amount of energy it takes to pump that much water from the Colorado River to Los Angeles. The invention has the potential to make ocean water available for drinking and irrigation on a large scale for the first time in human history. In the United States the pipelines which carry fresh water to our coastal cities could carry water in the opposite direction, from the oceans to the deserts and the Great Plains. Abundant pure water from the oceans will enable people to reclaim deserts along 50,000 miles (80,000 kilometers) of coastline in the Americas, Africa, Australia, and the Middle East.

Alcohol Distillation

By recycling heat efficiently this invention reduces the energy requirements of alcohol distillation by more than 90%. To distill a gallon (4.4 liters) of 160 proof alcohol the invention requires only 2000 BTU (0.6 kwh), about 5 cents' worth of energy. This new energy-recycling distillation technology will make it possible for almost any state or nation to become energy independent. The invention is an ideal village-scale technology for the underdeveloped countries: ecologically sound, consistent with human dignity, easy to understand and repair, capable of operating with any source of rotary motion as an energy input, and above all capable of producing premium liquid fuel from local materials at low cost. In coastal areas where feed stocks for alcohol are scarce, the ability of the invention to purify seawater for irrigation will make it easier to grow crops for energy production. The invention is much smaller than a conventional still—a unit the size of a small refrigerator will enable many farmers to produce enough alcohol from their waste crops to run their machinery.

Dehydration and Concentration

Many domestic and industrial processes are designed to remove water. The invention can reduce the cost of these processes up to 99% by recycling energy. For homeowners the invention will dry clothing, fruits, or vegetables. For the food processing industry it will concentrate fruit juices, dehydrate food products, and dehydrate watery waste materials. Oil companies, who draw up huge quantities of brine when drilling for oil and pay to dispose of it, will value the invention's ability to separate the salts from the water at low cost. The geothermal energy industry will also welcome the ability to dehydrate brines inexpensively for safe and easy disposal of salts and other minerals. Alcohol fuel producers can use the invention to concentrate their fruit juices before fermentation to obtain a higher yield of alcohol, and also to dry their grains and liquid residues to sell them as animal feed.

Power Generation

Like power plants fired by fossil fuels or nuclear energy, the invention generates electricity by boiling water to create a head of steam. The invention is novel in that it recycles heat to sustain the boiling action. The power generation process requires a flow of fresh water into the boiling chambers and a flow of concentrated brine into the condensing chambers. Energy becomes available because of the difference in steam pressure between the fresh water and the brine. The fresh water, having a higher steam pressure, evaporates easily. The brine, having a lower steam pressure, evaporates with more difficulty. Steam naturally flows from the high pressure area (the boiling fresh water) to the low pressure area (the hot brine). The flowing steam spins the blades of a turbine placed in its path and an electrical generator linked to the turbine transforms the rotary motion into electricity. When the steam reaches the hot brine it condenses and gives up its heat. This heat flows through stainless steel sheets back into the fresh water on the other side to sustain the boiling.

Any fresh water mixed into saturated brine by a power still can theoretically generate as much power as it wold from a dam nearly three miles (4.8 kilometers) high. Hoover Dam, by comparison, is 727 feet (221 meters) high. In practical applications every gallon of fresh water a power still mixes into saturated brine can generate 50 watt hours of electrical power (11 watt hours per liter). Wherever fresh water and brine exist naturally this process may prove very valuable. The river water and household wastewater running into the Great Salt Lake represent a substantial untapped energy source. The Israelis already have plans to pump ocean water from the Mediterranean Sea to the Dead Sea just to keep the Dead Sea from drying up. Since the Dead Sea water is twenty times saltier than the Mediterranean Sea water, power stills could generate electrical power by mixing the two. In this process no fuel is burned, virtually no waste heat is released, and there is no environmental pollution.

The table on the following page compares the energy requirements of this invention with those of conventional equipment. Comparative costs are also listed. The cost figures assumed a rate of 11 cents per kilowatt hour for every process except large-scale seawater distillation. The costs of large-scale seawater distillation are figured at industrial rates of 7 cents per kilowatt hour. The remainder of this document describes in detail the new heat exchange technology which makes these cost breakthroughs possible.

TABLE OF COMPARATIVE ENERGY REQUIREMENTS AND COSTS

| | Conventional Stills | This Invention |
|---|---|---|
| Tapwater Distillation | 2800 watt hours ($.31) per gal. 636 watt hours ($.08) per liter | 50 watt hours ($.006) per gal. 11 watt hours ($.001) per liter |
| Small-Scale Seawater Distillation | 2800 watt hours ($.31) per gal. 636 watt hours ($.08) per liter | 60 watt hours ($.007) per gal. 13 watt hours ($.001) per liter |
| Large-Scale Seawater Distillation | 75 kwh ($5.25) per 1000 gal. 19 kwh ($1.33) per 1000 liters | 6 kwh ($0.42) per 1000 gal. 1.4 kwh ($0.10) per 1000 liters |
| Alcohol Fuel Distillation | 25,000–45,000 BTU ($.81–$1.45) per gal. 1.7–3.0 kwh ($.18–$.33) per liter | 2,000 BTU ($.06) per gal. 0.13 kwh ($.01) per liter |

BRIEF DESCRIPTION OF THE DRAWINGS

FIG. 1 is an isometric view of a stacked-sheet core and heat exchanger.

FIG. 2 is an exploded drawing of the core of FIG. 1.

FIG. 3 is an exploded drawing of a variation of the core of FIG. 1.

FIG. 4 is an exploded drawing of the heat exchanger of FIG. 1.

FIG. 5 is an isometric view, partially exploded and partially in section, of a spiral core and heat exchanger.

FIG. 6 is an isometric view, partially in section, of a batch dehydrator-concentrator.

FIG. 7 is a cross-section of the boiling chamber of FIG. 6 along lines 7—7.

FIG. 8 is a cross-section of the condensing chamber of FIG. 6 along lines 8—8.

FIG. 9 is an isometric view, partially exploded, of a batch dehydrator.

FIG. 10 is a cross-sectional end view of the batch dehydrator of FIG. 9.

FIG. 11 is a cross-sectional side view of the batch dehydrator of FIG. 9.

FIG. 12 is an exploded drawing of a power generator.

DETAILED DESCRIPTION OF THE PREFERRED EMBODIMENTS

This section describes the various embodiments of the invention and their applications: water purification, counterflow heat exchange, alcohol distillation, dehydration and concentration of liquids, drying of solids, and generation of electrical power. In each application the invention recycles energy efficiently. In essence, every embodiment of the invention is a heat exchange apparatus, and every process described is a method of heat exchange.

Water Purification

The method is distillation: boiling water to convert it to pure steam. When the steam condenses it becomes pure liquid water. The invention recycles energy in two ways. First a counterflow heat exchanger heats the feed liquid nearly to its boiling point with energy given by the product and the blowdown. Then a boiler-condenser unit called a core boils the feed liquid with energy given by the condensing steam.

The Stacked-Sheet Still

FIG. 1 shows a stacked-sheet heat exchanger (11) and core (12) for purifying or concentrating liquids. Both the heat exchanger (11) and the core (12) are built by stacking sheets of metal, or some other material, with gaskets.

The counterflow heat exchanger. The counterflow heat exchanger (11) is built from 100 sheets of stainless steel type 316, known for its ability to resist corrosion from seawater. Each sheet measures 9"×12" by 0.01" (23 cm×30 cm×0.25 mm). Silicon rubber gaskets maintain a separation of 0.032" (0.81 mm) between the sheets. Fiberglass end plates stabilize the heat exchanger. The front end plate (13) measures 9"×12"×0.25" (64 cm×30 cm×6.35 mm), and the rear end plate (14) measures 11"×12"×0.25" (27.9 cm×30 cm×6.35 mm).

In the heat exchanger (11) the areas between the sheets form chambers for liquid flow. Chambers for hot liquid (the product or the blowdown) alternate with chambers for cold liquid (the feed water). Every sheet transfers heat from hot liquid flowing in one direction on one side into cold liquid flowing in the other direction on the other side.

The core. The core (12) is built from 51 sheets of stainless steel type 316. Each sheet is 16" tall, 12" wide, and 0.01" thick (41 cm×30 cm×0.25 mm). One side of each sheet serves as a boiling surface, and the other side serves as a condensing surface. Silicone rubber gaskets keep the sheets 0.06" (1.52 mm) apart. Two fiberglass end plates stabilize the core—the front end plate (17) measures 16"×12"×0.25" (41 cm×30 cm×6.35 mm), and the rear end plate (18) measures 16"×14"×0.25" (41 cm×36 cm×6.35 mm).

In the core (12) the areas between the sheets serve as chambers for boiling and condensing. All the boiling chambers interconnect and form the boiler; all the condensing chambers interconnect and form the condenser. Boiling chambers and condensing chambers alternate. Every sheet transfers heat from steam condensing on one side into a liquid boiling on the other.

The peripheral equipment. A compressor (16) bolted onto the core (12) blows vapors from the boiling chambers to the condensing chambers. (One example of a suitable compressor is Lamb compressor #115962.)

Three hoses in FIG. 1 connect the core (12) to the heat exchanger (11). The hose on the right (19) carries the blowdown from the core (12) to the heat exchanger (11). The hose in the center (21) carries the product from the core (12) to the heat exchanger (11). The hose on the left (22) carries feed liquid from the heat exchanger (11) to the core (12). This hose (22) contains a gas-liquid separator (28) for removing dissolved gases and liquids from the feed liquid. Dissolved gases and liquids come out of solution and leave through the gas-vapor outlet (35). (This process will be explained in more detail in a later section.)

The same hose (22) also contains a supplemental heater (23) which provides energy for start-up, then operates intermittently to maintain the desired operating conditions. (One example of a suitable heater is the "Immersion Heater" manufactured by A. O. Smith Co.) The heater (23) is controlled by a pressure switch (24) sensitive to steam pressure in the boiler. This pressure switch (24) connects to the boiler through a hose (26) which penetrates an opening (27) in the end plate (17).

When the pressure in the boiler raises more than 1 p.s.i (0.07 kilograms per square meter) above ambient pressure the switch (24) opens and shuts off power to the heater (23). When the pressure in the boiler becomes less than 0.5 p.s.i. (0.035 kg/sq m) above ambient pressure the switch (24) closes, and the flow of power to the heater resumes. The switch manufactured by Henry G. Dietz Co. (#171D8WC) gives acceptable results.

An alternative way to control the heater would be to monitor the temperature of the water in the boiler. In this event a thermistor would replace the pressure switch. Thermistor AP1H104-6 manufactured by Midwest Components Inc. would serve adequately. The thermistor would shut off power to the heater (23) when the water temperature reached 213° F. (101° C.) and restore power to the heater (23) when the water temperature dropped to 212° F. (100° C.).

The three hoses near the lower left corner of the heat exchanger (11) convey liquids to and from the system—hose (25) is an inlet for the feed liquid, hose (20) is an outlet for the product, and hose (15) is an outlet for the blowdown.

The Relative Importance of the Specifications. Of the structural dimensions specified for the core (12) and the heat exchanger (11) only two are critical: the thickness of the sheets and the distance between them. The thickness of the sheets should be within the range of 0.001" to 0.02" (0.025 mm to 0.51 mm). It would be possible to use sheets outside this range, but thinner sheets would easily tear or puncture, and thicker sheets would reduce efficiency, besides being prohibitively expensive. Sheets with a thickness of 0.01" (0.25 mm) are sturdy, inexpensive, and extremely heat conductive. The distance between the sheets must be within the range of 0.005" to 1.0" (0.13 mm to 2.54 cm) in the core (12) and within the range of 0.005" to 0.25" (0.13 mm to 6.4 mm) in the counterflow heat exchanger (11). The counterflow heat exchanger (11) achieves optimal efficiency when the spacing between the sheets is 0.1" (2.54 mm) or less, a spacing of 0.032" (0.81 mm) being ideal for most purposes.

Other aspects of the hardware offer a broad range of choices. The sheets may be fabricated from stainless steel, aluminum, brass, copper-nickel 90/10, glass, or polyester—any material which can be formed into a thin sheet and maintain its structural integrity at the operating temperatures. The height and width of the sheets are not particularly important, except in subtle ways to be mentioned later. Many common gasket materials will serve for the gaskets. The dimensions and materials of the end plates are unimportant, so long as they provide enough stability. Virtually any vapor compressor will serve adequately if its flow rate matches the flow rates of the core and the heat exchanger.

The number of sheets in the core and in the counterflow heat exchanger depends on the desired flow rate and efficiency. For a minimal flow rate, one heat transfer sheet is sufficient to create either a core or a counterflow heat exchanger. Combined with two end plates, one sheet will create the basic structure: a chamber containing relatively warm fluid on one side of the sheet and a chamber containing relatively cool fluid on the other side. The stacked-sheet core ordinarily comprises at least five sheets. The core (12) of FIG. 1, built from 51 sheets, purifies 15 gallons (66 liters) of water per hour. The counterflow heat exchanger (11) of FIG. 1, containing 100 sheets, heats up 30 gallons (132 liters) of cold water per hour, drawing heat from 15 gallons (66 liters) of product and 15 gallons (66 liters) of blowdown.

An Exploded Drawing of the Core. FIG. 2 is an exploded drawing of the core (12) of FIG. 1 exposing two heat transfer sheets (29 and 31). Both sheets have a gasket affixed to one surface. The sheet (29) on the left has a gasket (32) for a boiling chamber (33). The boiling chamber (33) lies between the two sheets, its boundaries defined by reference numbers (51) at the top, (30) at the bottom, (41) on the left, and (60) on the right.

The sheet (31) on the right has a gasket (34) for a condensing chamber (36). The condensing chamber (36) lies between the heat transfer sheet (31) and the front end plate (17). (Within the stack, of course, the condensing chambers lie between two adjacent heat transfer sheets—not between a sheet and an end plate.) The boundaries of the condensing chamber are indicated by reference numbers (52) at the top, (40) at the bottom, (39) on the left, and (80) on the right.

The Paths of Water and Steam through the Core of FIG. 2: The feed water. A hose (22) carries the heated feed water into the core (12) through an opening (37) in the end plate (17). Then the feed water passes through holes (38) 1" (2.54 cm) in diameter in all the sheets. It can't enter the condensing chambers (36) because the gaskets form a barrier (39). But it passes into all the boiling chambers (33) through openings (41) in the gaskets (32). A seal (42) holds the water and steam inside the system. When the water touches the heat transfer sheets (29 and 31) it receives heat from steam condensing in the adjacent chambers. The water boils and steam rises.

The Steam. The compressor (16) draws steam out of the boiling chambers (33) and blows it into the condensing chambers (36). The steam leaves the boiling chambers through holes (43) 1" (2.54 cm) in diameter near the top of all the sheets. It flows through an opening (44) in the end plate (17) and an opening (46) in the compressor manifold (47). Then the compressor (16) compresses the steam and ejects it through a second compressor manifold (48) and through a hole (not shown) in the rear end plate (18). The compressed steam flows through holes (49) ½" (1.27 cm) in diameter in each sheet. It can't enter the boiling chambers (33) because the gasket (32) forms a barrier (51). But it enters every condensing chamber (36) through an intake manifold (52).

When the steam touches the heat transfer sheets it condenses and gives up its heat. The steam condenses at a temperature hotter than the boiling liquid as a result of its being compressed. The heat given by the condensing steam flows from hot to cold—from the condensing surface, through the sheet, into the boiling water.

The product. The condensed steam, now distilled liquid water, drips down the sides of the sheets and flows out of the core. It leaves the condensing chambers through an outlet manifold (40). Then it flows through holes (53) ½ inch (1.27 cm) in diameter at the bottom of each sheet. As the product leaves the core (12) a barrier (30) keeps it from entering the boiling chambers. The product exits through an opening (54) in the front end plate (17). A hose (21) carries it to the heat exchanger.

The blowdown. The blowdown leaves the boiling chambers through openings (60) in the gasket. Then it passes through holes (56) 1" (2.54 cm) in diameter at the side of every sheet. A barrier (80) prevents the blowdown from entering the condensing chambers as it leaves the core. The blowdown passes through an opening (57) in the front end plate (17), then enters an outlet hose (19). A spill tube (58) in this hose regulates the level of water in the boiling chambers.

Other liquids may be distilled with this procedure. The operating conditions will vary, depending on the boiling temperture of the liquid.

Other Details of FIG. 2. A few details of the drawing remain to be mentioned. Small assembly holes (59) are punched on the perimeter of all the sheets. There are also four assembly holes (61) in the center of each sheet. In addition, the drawing shows assembly holes (50) in the end plates and assembly holes (55) in the compressor manifold (47). Bolts (not shown) pass through all these assembly holes to hold the system together. The small sections of gasket on the boiling and condensing surfaces are spacers (62). They hold the sheets apart at any pressure from a complete vacuum to two atmospheres.

The core (12) and heat exchanger (11) are built by cutting stainless steel sheets to size, punching holes in them, stacking them with gaskets, and bolting them together.

Performance Characteristics of the Stacked-Sheet Core. The stacked-sheet core (12) of FIGS. 1 and 2 purifies fifteen gallons of water per hour (66 liters/hour) while compressing the steam by 1 p.s.i. (0.07 kg/sq cm). Like the other embodiments of the invention, it yields a high energy multiplier—in other words, it recycles large quantities of energy in return for a small energy input. This core recycles 120,000 BTU (35.2 kwh) of heat energy per hour (enough to boil off fifteen gallons or 66 liters of water). The energy required to compress the steam by 1 p.s.i. (0.07 kg/sq cm) is 163 watt hours, or 556 BTU. The ratio of the recycled energy to the input energy is 215 to 1.

The 163 watt hours of energy required for compressing the steam do not include losses due to inefficiency of the compressor and compressor motor. The Lamb compressor is approximately 50% efficient, and its motor is approximately 50% efficient. With this peripheral equipment 652 actual watt hours are required to compress the steam. The ratio of recycled energy to input energy is slightly greater than 50 to 1.

There are several ways to increase the efficiency of the process. First, one could capture the waste heat from the compressor motor. Second, one could use more efficient peripheral equipment: an 80% efficient compressor driven by a 90% efficient electric motor. Third, one could use more sheets—doubling the heat transfer surface area will reduce by half the compression step required for a given output of distilled water. Incorporating all these steps would reduce the total energy requirements to 6.8 watt hours per gallon (1.5 watt hours/liter)—raising the ratio of transferred energy to input energy to 347 to 1.

Design Strategy in the Stacked-Sheet Still. The basic design strategy for all embodiments of the invention is to provide extensive heat transfer surface area for a given flow rate—at least 2 square feet of heat transfer surface for every gallon per hour (0.8 sq m/liter/hour) of fluid passing through. (The "fluid passing through" refers to the distilled liquid in the cores and to the cooler liquid in the counterflow heat exchangers.) The core (12) of FIGS. 1 and 2 establishes heat exchange relationship between the condensing steam and the boiling water over approximately 45 square feet (4.2 sq m) to boil off 15 gallons (66 liters) of water per hour—a ratio of 3 square feet per gallon per hour (1.2 sq m/liter/hour).

Sheet material is an ideal medium for transferring heat because it offers extensive surface area at low cost. Compared to the metal tubes used in previous heat-recycling stills, sheet material provides at least twenty times the surface area for the same price.

Low Compression. Extensive heat transfer surface area in the core makes it possible to condense the steam readily while compressing it only a small amount, less than 2 p.s.i. (0.14 kg/sq cm). Several important advantages of a low compression step have already been mentioned: the low energy requirements for compressing the steam, the opportunity to use thin sheets, the opportunity to stack the sheets close together for improved heat transfer, and the opportunity to use simple, inexpensive, long-lasting, quiet, efficient compressors.

Another advantage of low compression is a low temperature difference between the sheets and the boiling liquid. When the steam is compressed by less than 2 p.s.i. (0.14 kg/sq cm) the boiling surface of the heat transfer sheets will remain less than 8° F. (4.4° C.) hotter than the boiling water. With less than 1 p.s.i. (0.07 kg/sq cm) of compression this temperature difference will not exceed 4° F. (2.2° C.). A small temperature difference is valuable for three reasons. First, the water doesn't dissipate energy in random, turbulent motion—it boils gently, staying mostly at rest. Second, the water stays in close contact with the sheets. Virtually no steam barrier forms on the boiling surface to insulate the water from its heat source. Third, the relatively low temperature of the sheets reduces the problem of scale. Scale, a crust formed by the impurities left behind when seawater evaporates, reduces heat flow and must be removed periodically. This invention has less problem with scale than any previous distillation technology because the sheets aren't hot enough to bake the impurities onto the metal. Most of the impurities simply wash out with the blowdown. All these advantages derive directly from the extensive surface area-low compression approach.

Some minimum of compression is always necessary because steam must be pushed slightly "uphill," from a low pressure area in the boiler to a high pressure area in the condenser. The condenser has a higher pressure because the pure water there evaporates even more readily than the impure water in the boiler, and so exerts a higher steam pressure. To move steam uphill from the boiler to the condenser and cause it to condense, the compressor must supply a pressure step equal to the difference in steam pressures, plus a little more. As the compression step becomes lower and approaches the difference in steam pressures, the energy requirements of the process may approach the theoretical minimum.

In seawater distillation the difference in steam pressure between the distilled water in the condenser and the salty water in the boiler is equal to seventeen inches (43 cm) of water pressure, or about 0.6 p.s.i. (0.042 kg/sq cm). The minimum compression step to cause condensation in seawater distillation, then, is some amount slightly greater than 0.6 p.s.i. (0.042 kg/sq cm). The energy to provide this pressure difference comes to approximately 6 kilowatt hours per thousand gallons—very near 3 kilowatt hours, the theoretical minimum of energy required to distill seawater according to classical physics. This invention demonstrates an operational method of distilling seawater with energy requirements approaching the theoretical minimum.

Fresh water distillation requires even less energy than seawater distillation. In fresh water distillation less compression is required to move steam uphill into the condenser because the difference in steam pressure between the distilled water and the impure water is very slight.

Other Considerations for High Efficiency in Distillation

In order to recycle heat in distillation with efficiency approaching the theoretical limits, it is also necessary to do the following things:

1. Distribute impurities evenly throughout the boiler. Local concentrations of impurities will raise the boiling temperature of the water and may prevent it from boiling. The core of FIGS. 1 and 2 removes impurities from all parts of the boiler continuously by maintaining an even flow of water across the sheets in every boiling chamber.

2. Distribute heat evenly throughout the boiler. For high efficiency the water must boil throughout its volume, not just at hot spots. The core of FIGS. 1 and 2 distributes heat evenly by spreading water evenly across the boiling surfaces and by spreading steam evenly across the condensing surfaces. It spreads water across the boiling surfaces by partially filling each boiling chamber with water, regulating the level so that when the water boils it covers the entire boiling surface. This method has one disadvantage: the pressure on the water at the bottom of the boiler increases due to the weight of the water above it. This pressure increase raises the boiling temperature of the water and can keep it from boiling. The effects of the pressure increase are minimized by having a boiler only 1 foot (0.3 meters) deep. Even in large-scale applications the depth of the boiler in this embodiment would not exceed 3 feet (0.9 meters). This core spreads vapors evenly across the condensing surfaces with a rubber manifold containing many small holes, the pressure drop across each hole being great enough to ensure that steam enters each hole at an equal rate.

3. Minimize the pressure drop across the condenser from entrance to exit. Any pressure drop across the condenser means that the compressor must do extra work just to push the steam through the condensing chambers. In the core of FIGS. 1 and 2 the condensing chambers are only 1 to 3 feet (0.3 to 0.9 meters) long, and so the pressure drop across them is minimal—less than 0.25 p.s.i. (0.018 kg/sq cm). Very little of the compressor's energy is wasted in pushing the steam through the chambers. Most of the compressor's energy is used productively, for compressing and condensing the steam.

4. Remove non-condensible gases. One example of a non-condensible gas is the air dissolved in seawater. When the seawater boils, the air comes out of solution and enters the condenser along with the steam. But the air won't condense. If the air is allowed to accumulate in the condenser it will slow down the condensation of the steam and reduce efficiency. The core of FIGS. 1 and 2 exhausts non-condensible gases by maintaining a continuous flow of steam throughout the condenser and ensuring that some excess steam exits the condenser at all times to entrain the gases.

5. Remove the distilled water from the condensing chambers quickly and easily. This is important for two reasons. First, the distilled water interferes with the flow of heat by insulating steam from the condensing surfaces. Second, the compressor's energy requirements increase if it has to blow the distilled water out of the condenser. The core of FIGS. 1 and 2 has vertical condensing surfaces only 1 foot (0.3 meters) high. Distilled water drips down quickly and easily. The compressor does very little work to push it out of the condensing chambers.

6. Keep the system in thermal balance. This means adding or removing small amounts of heat to maintain the desired operating conditions. The core of FIGS. 1 and 2 keeps itself in thermal balance by adding make-up heat intermittently, only when necessary. To determine when make-up heat is needed one could monitor either water temperature or steam pressure in the boiler. The core in FIGS. 1 and 2 monitors steam pressure and controls the heater with a pressure switch in the manner described earlier.

7. Heat the feed liquid nearly to its boiling point before putting it into the boiler. If the feed liquid hasn't reached its boiling point when it enters the boiler, some of the energy given by the condensing steam must heat up the feed liquid, and heat from an outside source must be added to sustain the boiling rate. The high efficiency of this invention depends heavily on the ability of the counterflow heat exchanger to heat the feed liquid to a temperature near its boiling point. The heat exchanger will be examined in detail after a variation of the stacked-sheet core is discussed.

A Stacked-Sheet Core with a Vertical-Flow Boiler

The core (65) of FIG. 3 is identical to the core of FIGS. 1 and 2 in most respects. It is built from 51 sheets of stainless steel 0.01" (0.25 mm) thick, spaced 0.06" (1.52 mm) apart. It purifies 15 gallons of water per hour (66 liters/hr) with a compression step of 0.9 p.s.i. (0.06 kg/sq cm). It provides approximately 3 square feet (0.28 square meters) of heat transfer surface area for each gallon of distilled water produced per hour. It differs from the core of FIG. 2 only in the way it spreads liquids across the boiling surfaces. This core (65) introduces the feed liquid at the top of each boiling chamber and allows it to drip down the sides of the heat transfer sheets in a thin film. The structural changes required for the vertical-flow boiler are minor—one extra hole (63) is punched in the sheets, and the gaskets (70 and 75) have a slightly different configuration.

The Paths of Fluids in the Vertical-Flow Boiler. Fluids move through the core (65) of FIG. 3 just as they move through the core (12) of FIG. 2, except for the passage of feed liquid into the boiling chambers, which occurs in the following manner: First a hose (64) brings the feed liquid to the core (65). The feed liquid enters the core (65) through an opening (66) in the front end plate. Then it flows through a hole (63) ½" (1.27 cm) in diameter in all the sheets. The feed liquid can't enter the condensing chambers (67) because the gasket forms a barrier (68). But in each boiling chamber (69) the feed liquid enters an intake manifold (71) near the top of the sheet. It flows through openings (72) in the intake manifold and cascades down the sides of the sheets. The rest of the process occurs exactly as described in the discussion of FIG. 2.

Advantages and Disadvantages of the Vertical-Flow Boiler. The stacked sheet core (65) with the vertical-flow boiler offers two main advantages. First, it recycles heat with slightly greater efficiency than the horizontal-flow boiler shown in FIGS. 1 and 2 because pressure remains equal throughout the boiling chambers—there is no column of water to bear its own weight. As a result the water boils consistently in all parts of the chambers. Slightly less compression is required for a 15-gallon-per-hour (66 liters/hr) flow rate, and less make-up heat is needed. The second advantage is closely related to the first: no matter how deep the boiling chambers are, the water at the bottom of the chambers will boil readily. For this reason the vertical-flow boiler is more suitable for large-scale units.

The main disadvantage of the vertical-flow boiler is the difficulty in getting the water to flow evenly over the boiling surfaces. The water tends to flow in rivulets rather than an even film.

Having examined the stacked-sheet boiler-condenser units in detail, this discussion will now explain how the same design principles are embodied in the stacked-sheet counterflow heat exchanger.

The Stacked-Sheet Heat Exchanger

FIG. 4 is an exploded drawing of the heat exchanger (11) of FIG. 1 exposing four sheets (73, 74, 76, and 77) of stainless steel. Each sheet has a gasket (78) attached to one surface. The gaskets (78) keep the sheets separated by 0.03 inches (0.76 mm) and also guide the paths of the liquids. The areas between the sheets serve as chambers (79, 81, 82, and 83) for liquid flow. Chambers for the incoming cold liquid alternate with chambers for the outgoing hot liquids. The sheets transfer heat from the hot liquids flowing in one direction on one side into the cold liquid flowing in the opposite direction on the other side.

The six holes (84, 86, 87, 88, 89, and 91) at the left edge of the sheets, measuring 0.5 inches (1.27 cm) in diameter, allow liquids to enter and leave the heat exchanger. The smaller holes around the periphery of the sheets are assembly holes (92) for bolts to hold the heat exchanger together.

The Paths of Liquids through the Stacked-Sheet Heat Exchanger: The feed liquid. The feed liquid arrives at the heat exchanger through a hose (25). It enters the heat exchanger through an opening (94) at the bottom of the end plate (13). Then it flows through the lowest hole (84) in every sheet. It can't get into the first chamber (79) because the gasket (78) forms a barrier (96). But the feed liquid enters the second chamber (81) and the fourth chamber (83) through openings (97 and 93) in the gaskets (78).

Within its chambers (81 and 83) the feed liquid flows back and forth across the sheets along a path outlined by the gaskets, absorbing heat from the hot liquids in the adjacent chambers. After being heated the feed liquid leaves its chambers through the uppermost hole (91) in the sheet. Then it flows through holes (91) in every sheet and through an opening (98) in the end plate (13). A hose (22) carries it to the boiler.

The product. The product arrives at the heat exchanger from the condenser through a hose (21). It enters the heat exchanger through an opening (102) in the end plate (13). Then it flows through the second hole (89) from the top in every sheet. The product can't get into the first chamber (79) or the second chamber (81) because the gaskets (78) form barriers (101 and 103). But the product enters the third chamber (82) and other chambers through openings (104) in the gaskets (78).

As the product flows through its chambers (82 and others) it gives heat to the feed liquid in the adjacent chambers (such as 81 and 83). The product leaves its chambers through the second hole (86) from the bottom in every sheet. Then it passes through an opening (106) in the end plate (13). A hose (20) carries the product to a point of use or storage.

The blowdown. The blowdown arrives at the heat exchanger from the boiler through a third hose (19). It enters the heat exchanger through an opening (109) in the end plate (13). Then it flows through a hole (88) in all the sheets. The blowdown enters the first chamber (79) and other chambers (not shown) through openings (111) in the gasket (78).

As the blowdown streams through its chambers it gives heat to the feed liquid in the adjacent chambers. The blowdown leaves the heat exchanger through the third hole (87) from the bottom in every sheet, then flows through an opening (12) in the end plate (13). A hose (15) carries it out of the system.

Performance Characteristics of the Stacked-Sheet Heat Exchanger. The counterflow heat exchanger (11) shown in FIG. 4 heats thirty gallons (132 liters) of water per hour, raising its temperature from 60° F. to 207° F. (from 16° C. to 97° C.). Like the core of FIG. 2, the stacked-sheet heat exchanger achieves a high energy multiplier. It transfers 36,603 BTU (10.7 kwh) of heat energy from the product and the blowdown into the feed liquid every hour. The input energy required to move the liquids through the heat exchanger is 3.3 watt hours, or 11.2 BTU. The ratio of transferred energy to input energy is 3268 to 1.

Since the pressure drop across the heat exchanger is only one p.s.i. (0.07 kg/sq cm), the force of gravity is sufficient to cause liquids to pass through it. Alternatively one could use a simple pump. If the pump were 25% efficient, the total energy required to move the liquids through the heat exchanger would come to 45 BTU (13.2 watt hours). In this case the ratio of transferred energy to energy input would be 813 to 1.

Another way of measuring the effectiveness of the counterflow heat exchanger (11) is to compare its actual performance with the theoretical limit. The heat exchanger (11) of FIG. 4 raises the temperature of the feed liquid by 147° F., from 60° F. to 207° F. (by 81° C., from 16° C. to 97° C.). The highest temperature the feed liquid could possibly reach is 212° F., (100° C.), which is the temperature of the product and the blowdown as they enter the heat exchanger. This heat exchanger, then, heats the cooler liquid to within 5° F. (3° C.) of the theoretical limit. The 5° F. difference between the actual and the theoretical is known as the "approach temperature." The ratio of the total temperature shift of the cooler liquid to the approach temperature is a measure of the heat exchanger's performance. In this heat exchanger the ratio between the actual temperature shift of the feed liquid and the approach temperature is 147 to 5, or 29 to 1. (Using degrees centigrade, the ratio is 27 to 1).

An even higher standard of performance can be achieved by adding more surface area for the same flow rate. If the number of sheets were doubled, the approach temperature would be reduced by half. In this case the ratio between the actual temperature shift and the approach temperature would be twice as great, or 48 to 1.

Design Criteria for the Stacked-Sheet Heat Exchanger. Extensive surface area is the key to efficiency. Like the other embodiments of the invention, the stacked-sheet heat exchangers provide at least 2 square feet of heat transfer surface area for each gallon per hour (0.8 sq m/liter/hr) of cooler fluid passing through. The heat exchanger of FIG. 4 uses approximately 90 square feet (8.37 sq m) of surface area to heat 30 gallons (132 liters) of liquid per hour, a ratio of 3 square feet per gallon per hour (1.2 sq m/liter/hr).

With so much surface area available, the liquids can exchange heat readily even though they flow with low velocities (less than 1 foot per second, or 0.3 meters per second), low pressure heads (less than 1 p.s.i., or 0.07 kg/sq cm), and a laminar flow pattern. (Laminar flow is smooth and orderly, with individual molecules tending to follow the same paths.) The advantages of this gentle approach have already been mentioned: little energy is required to move the liquids through their chambers, the smoothly flowing liquids dissipate little energy in turbulence, the sheets transferring heat may be very thin, and the sheets may be placed very close together for optimal heat transfer.

In distillation the counterflow heat exchanger (11) should raise the temperature of the the feed liquid high enough so available waste heat from the compressor motor can bring its temperature all the way to the boiling point. The counterflow heat exchangers of the invention meet this requirement with simple, compact, inexpensive hardware.

Removal of Dissolved Liquids and Gases. The ability of the heat exchanger (11) to heat the feed liquid nearly to its boiling point offers another important advantage: a convenient way to remove toxic gases and liquids dissolved in the impure water. If these gases and liquids are allowed to enter the boiler they go off with the steam and contaminate the distilled water. The heat exchanger helps to remove dissolved gases and liquids because the water can't hold them in solution as it approaches its boiling point. The liquids vaporize, and both the gases and liquids form bubbles. A gas-liquid separator in the feed line between the heat exchanger (11) and the core (12) will allow the bubbles to rise from the water, thereby removing the toxic substances. In its simplest form the separator is an exit pipe to atmosphere with a valve to allow the exhaustion of gases except when the liquid level nears the outlet, at which time the valve closes. A gas-liquid separator is valuable for removing trihalomethanes or other poisonous gases from tapwater, for removing carbon dioxide from seawater to help reduce scale formation, and for removing any non-condensible gases to keep them from slowing down the condensation process.

Other Applications for the Heat Exchanger. Although the counteflow heat exchangers shown in the drawings are all three-fluid heat exchangers appropriate for distillation, other embodiments of the invention could easily accomodate any number of liquids for different applications. Many applications exist for two-fluid counterflow heat exchangers. In homes, for example, heat exchangers can capture heat from hot water leaving the shower, the clothes washer, or the dish water, and transfer that heat into the cold water from the city water pipes. The energy requirements of hot water heaters will drop drastically if people feed heated water instead of cold water into them. There are also many industrial applications for heat exchangers, and still more applications will be found as energy efficiency becomes more important.

This discussion will now turn to another still, similar to the stacked-sheet model in its structure and function but different in its appearance and construction techniques.

The Spiral Still

FIG. 5 shows two more embodiments of the invention suitable for purifying liquids: a spiral core (114) and a spiral counterflow heat exchanger (116).

The spiral core. The core (114) of FIG. 5 is constructed from two sheets of stainless steel (type 316) wrapped around each other to form two spiral-shaped chambers: a boiler (100) and a condenser (105) in heat exchange relationship. The sheets are 25 feet long, 1 foot wide, and 0.01" thick (5.1 m×0.3 m×0.25 mm). Spacers keep the sheets 0.06" (1.52 mm) apart. Gaskets (115) seal the chambers. The sheets transfer heat from vapors condensing on one side into a liquid boiling on the other.

The spiral heat exchanger. The heat exchanger (116) of FIG. 5 is built from three sheets of stainless steel. Each sheet measures 32 feet by 1 foot by 0.01" (9.8 m×0.3 m×0.25 mm). They wrap around each other to form three spiral-shaped chambers for the feed liquid, the product, and the blowdown. Spacers keep the sheets 0.032" (0.81 mm) apart. Gaskets (110) seal the chambers. The sheets transfer heat from hot liquid on one side into the cold liquid on the other.

The Relative Importance of the Specifications. In the spiral core (114) and heat exchanger (116) the most significant structural dimensions are the thickness of the sheets and the distance between them. The thickness of the sheets must be within the range of 0.001" to 0.02" (0.025 mm to 0.51 mm). The separation between the sheets must be within the range of 0.005" to 1.0" (0.13 mm to 2.54 cm) in the core, and within the range of 0.005" to 0.25" (0.13 mm to 6.4 mm) in the counterflow heat exchanger. The sheets may be constructed from stainless steel, aluminum, glass, polyester, or any other material that can be formed into a thin sheet and maintain its structural integrity at operating temperatures. The length and height of the sheets are not critical, except that the amount of surface area determines flow rate and efficiency. Any standard gasket material would be suitable.

Design Strategy and Performance Characteristics of the Spiral Still. The design strategy and performance characteristics are nearly identical to those of the stacked-sheet stills. Both the spiral core (114) and the spiral counterflow heat exchanger (116) supply extensive surface area for heat transfer, slightly more than three square feet per gallon per hour (1.2 sq m/liter/hr). With extensive surface area in the core (114), the vapors can condense readily with only a small compression step. The spiral core (114) purifies fifteen gallons per hour (66 liters/hr) with a compression step of 1 p.s.i. (0.07 kg/sq cm). With extensive surface area in the counterflow heat exchanger (116), the liquids can exchange heat readily even though they flow gently. The spiral heat exchanger (116) heats thirty gallons (132 liters) of water per hour from 60° F. to 206° F. with a pressure drop of 1 p.s.i. across the chambers (from 16° C. to 97° C. with 0.07 kg/sq cm).

The Paths of Liquids and Vapors through the Spiral Still: The feed liquid. The feed liquid enters the central chamber of the heat exchanger (116) through the opening (117) at the lower right of the drawing. It receives heat from the product and the blowdown as it winds through the turns of the spiral. Then the feed liquid flows through a hose (118) from the heat exchanger to the core (114). This hose (118) connects with metal tubes (119) which spill the feed liquid near the top of the boiler (100). Inside the boiler (100) the feed liquid receives heat from vapors condensing on the opposite sides of the sheets and boils.

The vapors. A compressor (121) driven by a motor (122) draws vapors out at the top of the boiler (100). First the vapors enter a demister (123). The demister (123) consists of a series of baffles—it leads the vapors in a tortuous path to prevent them from carrying any entrained droplets of liquid into the condenser (105). (In most applications a demister will not be necessary. In seawater distillation, for example, the spiral still reduces the total dissolved solids from 35,000 parts per million to fewer than 3 parts per million without a demister. A demister would be important only when extremely pure water is needed, for example in manufacturing computer parts.) The compressor (121) compresses the vapors, then blows them through the compressor manifold (124) into the condenser (105). (The compressor manifold (124) rests on the core and the compressor when the core is in operation—the drawing elevates the manifold to reveal the compressor and the openings in the seals.) When the compressed vapors enter the condenser (105) and touch the heat transfer sheets, they condense and give up their heat. This heat flows through the sheets to boil the liquid on the other side.

The product and the blowdown. The distilled liquid drips down the walls of the condenser (105). A hose (126) carries it from the condenser (105) to the heat exchanger. Another hose (127) carries blowdown from the boiler (100) to the heat exchanger.

Advantages and Disadvantages of the Spiral Configurations. The spiral configurations are easier to build in some respects—there is no need to cut the sheets into small sections, to punch holes, or to make complicated gaskets. But the spirals have two main disadvantages: it's difficult to seal them, and it's difficult to disassemble them for cleaning.

Vacuum Distillation

By drawing a vacuum on any spiral or stacked-sheet core one can boil the feed liquid at a lower temperature. Vacuum distillation offers three main advantages:

(1) Vacuum distillation of seawater can reduce scale formation. Hard scale forms only at temperatures above 185° F. (85° C.). At lower temperatures only soft scale forms. Soft scale is much easier to remove. By drawing enough of a vacuum to boil the seawater at 185° (85° C.) or a lower temperature one can eliminate hard scale entirely.

(2) Vacuum distillation sometimes makes it possible to capture the waste heat from the compressor motor. This waste heat can be captured by passing the heated feed liquid through a metal coil wrapped around the compressor motor. But the heated feed liquid must be cooler than the motor because heat will only flow from hot to cold. In some circumstances a vacuum will lower the boiling temperature of the liquid below the operating temperature of the motor.

(3) By drawing a vacuum one can distill liquids at ambient temperature, in which case a heat exchanger would not be necessary. In large-scale situations it might be valuable to eliminate the capital costs of the heat exchanger.

To this point the discussion has focused on water distillation, a process in which only one liquid will vaporize (unless traces of a second liquid are dissolved in water). Next it will examine how the invention performs in a distillation process in which two liquids will vaporize.

Alcohol Distillation

The goal of this process is to separate alcohol from water. Nature gives a mixture of alcohol and water when plants ferment. Since alcohol evaporates more easily than water, it is possible to concentrate, the alcohol by distilling the mixture.

The Hardware. The cores and heat exchangers shown in FIGS. 1, 2, 3, 4, and 5, will distill alcohol with no adaptation or adjustment.

The Process. The invention distills alcohol with the same energy-recycling process it uses to purify water. The feed liquid is a mixture of alcohol and water. In the alcohol fuel industry this mixture is commonly called "beer." The beer enters a heat exchanger, where it receives heat from the product and the blowdown. Then it enters a boiler, where it receives heat from condensing vapors and boils. Both alcohol and water evaporate, but alcohol evaporates preferentially.

A compressor blows alcohol and water vapors from the boiler to the condenser. The vapors condense on a thin sheet and give up their heat.

This heat flows through the sheet to boil the beer on the other side. The condensed liquid has a higher concentration of alcohol than the original beer. This product liquid, the distilled alcohol, leaves the condenser and flows through a heat exchanger to give heat to incoming beer.

The blowdown, the liquid remaining in the boiler, is a mixture of alcohol and water with a lower concentration of alcohol than the beer. The blowdown also enters the heat exchanger to give heat to the incoming beer.

Specifications Unique to Alcohol Distillation. This method of distilling alcohol differs from the method of purifying water described earlier in two important respects—first, alcohol distillation requires a slightly higher pressure step, within the range of 1 to 8 p.s.i. (0.07 to 0.56 kg/sq cm). The higher pressure step is needed because there are two vapors (alcohol and water) in the condenser. Until 1 to 8 p.s.i. (0.07 to 0.56 kg/sq cm) of compression is added, neither alcohol vapors nor water vapors may have enough pressure to condense. Second, the temperature difference between the boiling surfaces of the heat transfer sheets and the boiling liquid is greater in alcohol distillation, up to 15° F. (8° C.). This higher temperature difference is a result of the higher compression step.

Compressing the vapors and recycling their heat is a novel approach to alcohol distillation. It reduces the energy requirements of the process more than tenfold. The design of the heat exchanger and the core leads to high efficiency for all the same reasons explained earlier with reference to water purification.

Operating Conditions. Three passes are usually required to distill fuel-grade alcohol from a fermentation product. Assuming the fermentation product contains 15% alcohol, the first distillation may employ a compression step of 7 p.s.i. (0.49 kg/sq cm) and increase the alcohol to 35%. The second distillation may compress the vapors by 5 p.s.i. (0.35 kg/sq cm) and raise the alcohol content to 60%. The third pass may involve 7 p.s.i. (0.49 kg/sq cm) of compression and bring the mixture to 75% alcohol.

Alcohol distillation may also be performed at a vacuum, either to eliminate the need for a heat exchanger or to capture the waste heat from the compressor motor.

Separation of Alcohol and Water in the Condenser. A second method of alcohol distillation separates alcohol from water in the condenser as well as the boiler. By compressing the vapors slightly, within the range of 1 to 4 p.s.i. (0.07 to 0.28 kg/sq cm), one can condense water vapors selectively in the first distillation. (Water vapors condense more easily than alcohol vapors in the first distillation because they have a much higher percentage of the total volume of vapors. They have a higher percentage of the volume because the beer is mostly water and because water expands two-and-a-half times as much as alcohol when the two evaporate.) With a compression step in the range of 1 to 4 p.s.i. (0.07 to 0.28 kg/sq cm) the water vapors condense readily, but the alcohol vapors still don't have a high enough pressure to condense. By collecting the uncondensed vapors leaving the condenser and condensing them separately, one can obtain an alcohol-water mixture with a higher concentration of alcohol than the vapors which rose from the boiling beer. This method requires slightly more energy than the method described earlier because the energy of the uncondensed vapors cannot be recycled. But this method separates alcohol from water more effectively in the first distillation.

The next process differs from alcohol distillation and water purification in that the main product is the substance that won't boil off.

Dehydrating and Concentrating Liquids

The goal of these distillation processes is to boil off a liquid to collect what remains. In most cases the liquid to be removed is water. Dehydrating means removing all the water; concentrating means removing some of the water. In alcohol fuel production these processes are valuable for concentrating fruit juices before fermentation and for dehydrating residues in the blowdown. The invention will also dehydrate the watery residues of food processing plants, industrial wastewater, and raw sewage.

If the liquid to be concentrated is not too viscous, the invention will concentrate it in a continuous flow. The cores and heat exchangers shown in FIGS. 1, 2, 3, 4, and 5 concentrate liquids with the same procedure they use to purify water—the only difference is that the "blowdown" from the boiler becomes the main product, and the distilled water from the condenser becomes a valuable by-product. No changes are required in the hardware. The method and the performance characteristics are also the same as in water purification, except that compression requirements will increase if a high concentration of the liquid is desired. By recycling heat efficiently this invention reduces the energy requirements for concentrating liquids up to 99%.

Whenever the liquid is too viscous for a continuous flow process it is possible to concentrate or dehydrate one batch of it at a time. FIG. 6 shows a core for a batch process.

The Batch Dehydrator/Concentrator

FIG. 6 is a cutaway drawing of a batch dehydrator/concentrator. A folded core (128) lies inside a vat (129). The vat (129), serving as a boiler, contains a mixture of solids and liquids to be separated. A lid (131) rests atop the vat (129). A compressor (125) and compressor motor (132) fasten to the lid (131).

The core (128) is built by folding a single sheet of stainless steel many times to create an alternating sequence of boiling and condensing chambers in heat exchange relationship. The sheet is fifty feet long, twelve inches wide, and 0.01 inches thick (15.2 m×0.3 m×0.254 mm). Gaskets maintain a separation of 0.06" (1.52 mm) between the folds. Each vertical section of the sheet transfers heat from condensing vapors on one side into the boiling liquid on the other.

The thickness of the sheet and the spacing between the folds are the most important structural dimensions. The thickness of the sheet may range from 0.001" to 0.02" (0.025 mm to 0.51 mm). The distance between the folds may range from 0.005" to 1.0" (0.13 mm to 2.54 cm). The sheet may be constructed from the same broad range of materials described with reference to the other cores. The specific gasket material is unimportant.

The Process. This section explains briefly how the batch dehydrator/concentrator of FIG. 6 can dehydrate watery wastes of food processing plants. The first step is to bring the wastewater to a temperature near its boiling point. This may be accomplished either by heating the wastewater or by drawing a vacuum on the vat (129). (In either case it will be necessary to add or remove small amounts of heat to maintain the desired operating conditions.) Once the wastewater is in the vat (129), the next steps are lowering the core (128) into the vat (129) and fastening the lid. The wastewater can't get into the condensing chambers because they're sealed on the sides and at the bottom. But it enters the boiling chambers, which are open at the bottom.

The compressor compresses the steam from the boiling chambers by 1 p.s.i. (0.07 kg/sq cm), then blows it into the condensing chambers. When the compressed steam touches the condensing surfaces of the heat transfer sheet it condenses at a temperature hotter than the boiling liquid. Its heat flows through the sheet to boil the wastewater on the other side.

The condensed liquid is pure distilled water. It flows through a hole at the bottom of the sheets and into a tube (133) which carries it out of the system. (The distilled water will flow upward for a few inches because of the slight pressure increase in the condenser.)

After the wastewater has boiled off, the solids remain in the vat (129). They may be collected easily after the lid (131) has been lifted and the core (128) has been removed. Any solids remaining in the boiling chambers can be blown out with compressed air.

Cross-Sectional Views of the Batch Dehydrator/Concentrator. The next two drawings offer detailed views of the inside of this core: FIG. 7, a cross-sectional drawing of a boiling chamber, and FIG. 8, a cross-sectional drawing of a condensing chamber. Both drawings show the vat (129), the lid (131), the compressor (125), and the compressor motor (132). The gaskets are the only parts of FIGS. 6 and 7 that differ. The gaskets (130) in the boiling chamber are open on the top and bottom; the gaskets (135) in the condensing chamber are open on the sides.

Arrows in FIG. 7 show how steam flows out the top of the boiling chambers into the compressor. The narrow strip of gasket material at the top of the boiling chambers is a demister (134). The demister (134) forces the steam to flow to either side a short distance before it can reach the compressor (125). This short diversion makes it more difficult for the steam to carry away any droplets of liquid.

Arrows in FIG. 8 show the path of the steam from the compressor (125) into the condensing chamber. The steam condenses on the heat transfer sheets. The distilled water flows out of the condensing chambers through a hole (136) in the bottom of the sheets. In the boiling chambers (FIG. 7) the gasket forms a barrier (137) around this hole to keep the distilled water out of the boiling chambers as it leaves the core.

The small pieces of gasket on the sheet are spacers (140) to keep the folds apart at any pressure from a complete vacuum to two atmospheres.

Performance Characteristics of the Batch Dehydrator/Concentrator. The Batch Dehydrator-Concentrator of FIG. 6 removes liquid from a concentrated solution at the rate of fifteen gallons (66 liters) per hour. The pressure step required depends on how concentrated the solution is. The more concentrated the solution in the boiler, the lower its vapor pressure, and the more work the compressor has to do to move steam uphill into the high-pressure area of the condenser. Assuming a compression step of 2 p.s.i. (0.14 kg/sq cm) with a 50% efficient compressor driven by a 50% efficient motor, the ratio of recycled energy to actual input energy is approximately 25 to 1. Higher energy multipliers can be achieved by increasing the heat transfer surface area or by using a more efficient compressor and compressor motor.

Although the process described above is applicable only to liquids, a similar dehydration process will remove moisture from solids.

Drying Solids

The goal of this distillation process is to remove a liquid from a wet solid—for example, to dry clothing, fruits, vegetables, or distiller's grains. The invention recycles energy by evaporating the liquid, compressing its vapors, condensing the vapors on a thin sheet of material, and recycling heat from the condensing vapors back into the evaporator to dry the solids.

The Batch Dehydrator

FIG. 9 is a cutaway drawing of a batch dehydrator. It consists of a curved stainless steel heat transfer sheet (138) inside a cylindrical case (139). The sheet measures ten feet long, three feet wide, and 0.01" thick (3.04 m×0.91 m×0.0254 mm). The area inside the curved sheet serves as a boiler or evaporator (147)—a receptacle for the solids to be dried. The area between the sheet (138) and the case (139) serves as a condenser. A compressor (141) and compressor (145) are mounted on the end.

The heat transfer sheet (138) may be constructed from any material which can be formed into a thin sheet and maintain its structural integrity at the operating temperatures. For best results the thickness of the sheet should be within the range of 0.001" to 0.02" (0.025 mm to 0.51 mm). The length and width of the sheet may vary depending on the quantity of grains or clothing to be dried.

The Process. This section explains how the batch dehydrator dries clothing (or any other wet solids). The first steps are inserting a load of wet clothing through the front opening (142) and closing the door (143). The next step is adding heat or drawing a vacuum to begin evaporating the water. The compressor (141) draws the water vapor (steam) through a small hole (144) at the end of the evaporator. Then it compresses the vapor by 1 p.s.i. (0.07 kg/sq cm) and blows it around to the other side of the sheet.

When the compressed water vapor strikes the condensing surface of the heat transfer sheet it condenses at a temperature hotter than the clothing. Its heat flows through the heat transfer sheet into the evaporator to dry the clothing. The condensed liquid leaves the condenser through a hole (146) at the bottom of the case.

Other views of the Batch Dehydrator. FIG. 10 shows the batch dehydrator of FIG. 9 in a cross-sectional view from the end. The heat transfer sheet (138) and the case (139) are shown, as are the evaporator (147), the condenser (148), and the hole (146) where distilled water drains from the condenser.

FIG. 11 shows the same batch dehydrator in a cross-sectional view from the side. This drawing shows the heat transfer sheet (138), the case (139), the front opening (142) where the solids are inserted, the hole (144) where the compressor draws out the steam, and the hole (146) at the bottom of the case where distilled water leaves the condenser.

Other Considerations for High Efficiency. For optimal efficiency in drying solids, it's necessary to do three more things:

1. Remove non-condensible gases. If air or other non-condensible gases are allowed to accumulate in the condenser they will slow down the condensation process. The easiest way to remove non-condensible gases is to draw a vacuum on the core from the outlet to the condenser.

2. Maintain thermal balance. It will be necessary to add or remove small amounts of heat to maintain the desired operating conditions.

3. Keep the wet solids in close contact with the heat transfer sheet. For this reason it's advisable to rotate the batch dehydrator like a conventional clothes dryer. The solids dry by tumbling against the evaporation surface.

Performance Characteristics of the Batch Dehydrator. The dehydrator of FIG. 9 will accept a ten-pound (4.5 kg) load of wet clothing. The fabric makes up six pounds (2.7 kg) of the load, and moisture makes up the other four pounds (1.8 kg). The dehydrator dries the clothing in thirty minutes. It recycles 3840 BTU (1.13 kwh) of heat energy to evaporate the four pounds (1.8 kg) of water. The theoretical energy input required to compress the water vapor by 1 p.s.i. is 18 BTU (5.3 watt hours). The ratio of the recycled energy to the theoretical input energy is 3840 to 18, or 213 to 1. Assuming the compressor is 50% efficient and the compressor motor is 50% efficient, approximately 72 BTU (21.2 watt hours) of energy will be required to compress the steam. Under these circumstances, the ratio of recycled energy to actual input energy will be slightly greater than 50 to 1.

Design Criteria for the Batch Dehydrator. The most important design consideration for the batch dehydrator is extensive heat transfer surface area for the flow rate of distilled water—at least two square feet each for gallon of fluid evaporated per hour (0.8 sq m/liter/hr). The dehydrator of FIG. 9 supplies thirty square feet per gallon per hour (12 sq m/liter/hr).

The final application of this invention, unlike the others, is not a separation process at all. It might be called a mixing process—it mixes liquids of different salinities to capture the energy that is released.

Power Generation

The goal of this distillation process is to generate a head of steam for doing useful work. The invention recycles energy to sustain the boiling action.

The Process. The apparatus boils fresh water to generate a head of steam. The steam spins the blades of a turbine. An electrical generator linked to the turbine converts the rotary motion into electricity. Then the steam condenses in hot concentrated brine and gives up its heat. This heat flows through sheets of material to boil the fresh water on the other side. The diluted brine flows from the condenser to a heat exchanger, where it gives heat to incoming fresh water and salt water.

This process requires that the boiler be a high pressure area relative to the condenser, so steam will naturally flow from the boiler to the condenser. But it also requires that the condenser be a high temperature area relative to the boiler, so heat will naturally flow from the condenser to the boiler. Both these conditions are met by introducing fresh water into the boiler and concentrated brine into the condenser. The dissolved salts lower the steam pressure of the brine. Its steam pressure remains lower than that of the fresh water, even when the brine becomes slightly hotter.

The Power Generator

FIG. 12 is an exploded drawing of a stacked-sheet core for generating power. This core was built by stacking together 51 heat transfer sheets made of stainless steel type 316. The sheets measure 12"×16"×0.01" (0.3 m×0.4 m×0.25 mm). Gaskets maintain a separation of 0.06" (1.52 mm) between the sheets. The areas between the sheets serve as chambers for boiling the fresh water and for condensing its vapors in hot salt water. Boiling chambers and condensing chambers alternate. Each sheet transfers heat from the hot salt water on one side into the boiling fresh water on the other.

The Relative Importance of the Specifications. As in the other cores, the important structural dimensions which define the invention are the thickness of the sheets and the distance between them. The thickness of the sheets must be within the range of 0.001" to 0.02" (0.025 mm to 0.51 mm). The distance between the sheets must be within the range of 0.005" to 1.0" (0.13 mm to 2.54 cm). The sheets may be constructed from the same range of materials described with reference to FIG. 1. The height and width of the sheets are not critical. The number of sheets depends on the desired flow rate. The turbine may be replaced by a positive displacement piston or any other means of converting vapor flow into mechanical motion.

The Sheets and the Chambers. FIG. 12 exposes two heat transfer sheets (149 and 151). Both sheets have a gasket affixed to one surface. The sheet (149) on the right has a gasket (152) to form a boiling chamber (153). The boiling chamber (153) lies between the sheet (152) and the front end plate (154). (Within the stack the boiling chambers lie between successive heat transfer sheets.) The boundaries of the boiling chamber (153) are defined by reference numbers (182) at the top, (193) at the bottom, (168) at the left, and (202) at the right. The sheet (151) on the left has a gasket (156) to form a condensing chamber (157). The condensing chamber (157) lies between the two heat transfer sheets (149 and 151). Its boundaries are indicated by reference numbers (184) at the top, (194) at the bottom, (169) at the left, and (203) at the right.

The other prominent elements of the drawing are a turbine (158), a pressure switch (159), and the rear end plate (161).

Paths of Liquids and Vapors through the Core of FIG. 12. This section will explain how salt water enters the condensing chambers, fresh water enters the boiling chambers, steam flows from the boiling chambers to the condensing chambers, and diluted salt water leaves the condensing chambers.

The salt water. The salt water arrives at the core in a hose (162) at the left of the front end plate (154). (If a heat exchanger is in use, the salt water will have already been heated by diluted water leaving the process.) A heater (163) connected to this hose (162) adds small amounts of heat intermittently to maintain the desired operating conditions.

The heater (163) is controlled by a pressure switch (159) sensitive to steam pressure in the condenser. The pressure switch (159) communicates with the condenser through a hose (150), an opening (155) in the end plate, and holes (160) 1" (2.54 cm) in diameter in the sheets. When the steam pressure drops too low the switch (159) closes, completing a circuit so power can flow to the heater (163). When the steam pressure becomes high enough, the switch (159) opens, breaking the circuit and shutting off power to the heater (163).

The salt water enters the core through an opening (164) in the end plate, then flows through holes (166) 1" (2.54 cm) in diameter in all the sheets. Gaskets form a seal (167) to keep the liquids and vapors inside the system. The salt water can't enter the boiling chambers (153) because the gaskets form barriers (168). But it enters each condensing chamber (157) through openings (169) in the gaskets (156). The salt water partially fills each condensing chamber (157). A spill tube (171) regulates the height of the salt water so it covers the entire surface of the sheets.

The fresh water. Fresh water approaches the core in a hose (172) to the right of the end plate (154). (If a heat exchanger is being used, the fresh water has also been heated to a temperature near its boiling point by the outgoing diluted salt water.) The fresh water streams into the core through an opening (173) in the end plate (154), then flows through holes (174) 1" (2.54 cm) in diameter in the lower corners of each sheet. The fresh water can't enter the condensing chambers (157) because the gaskets (156) form a barrier (176). But it enters each boiling chamber (153) through an opening (177) in the gaskets (152) and spreads evenly across the boiling surfaces of the heat transfer sheets. The fresh water partially fills each boiling chamber (153), its height regulated by a spill tube (178) so it covers the entire boiling surface when it boils.

Fresh water from the boiling chambers (153) seeks its own level in the spill tube (178) assembly. The fresh water flows through an opening (170) in the gaskets and through holes (165) in the sheets. The gasket forms a barrier (190) to keep the fresh water out of the condensing chambers. Then the fresh water flows through an opening (180) in the end plate and into a hose (185) containing the spill tube (178). A second hose (175) connects the spill tube with the top of the boiling chambers to provide a pressure reference. Steam from the boiling chambers enters this hose (175) through holes (195) in the sheets and an opening (179) in the end plate. Any fresh water overflow falls through the spill tube (178) and into a hose (181). This hose (181) carries the fresh water overflow to the heat exchanger, where it joins the diluted salt water to give heat to the incoming fresh water and salt water.

The steam. Inside each boiling chamber (153) the fresh water receives heat from hot salt water on the opposite sides of the sheets. The fresh water boils and steam rises. The steam expands toward the low-pressure area in the condensing chambers (157). It rushes out of each boiling chamber (153) through an outlet manifold (182) at the top. Then the steam flows through holes (183) half an inch in diameter at the top of each sheet on its way out of the core. As it exits, a barrier (184) keeps it out of each condensing chamber.

The steam rushes through an opening (186) in the end plate (154) and enters an expander (201). The expander consists of a small manifold (187), two hoses (188 and 189), and a turbine (158). The expanding steam spins the turbine blades, just like a wind spins a windmill. The spinning motion of the turbine can generate electrical power, pump water, or do other useful work.

The second hose (189) carries steam from the turbine back into the core. The steam flows through through an opening (191) in the end plate (154) and through holes (192) ½" (1.27 cm) in diameter at the bottom of every sheet. The steam can't enter the boiling chambers (153) because the gasket (152) forms a barrier (193). But the steam enters each condensing chamber (157) through an inlet manifold (194) formed by the gasket (156). This inlet manifold (194) contains many small openings, the pressure drop across each opening being great enough so steam enters each opening at an equal rate. As a result stem spreads evenly throughout the salt water in the condensing chambers (157).

When the steam contacts the hot salt water it condenses and gives up its heat. This heat raises the temperature of the salt water in the condensing chambers (157), making it hotter than the fresh water in the boiling chambers (153). Heat from the salt water flows through the sheets to boil the fresh water on the other side. The boiling fresh water generates more steam, and the cycle continues.

The diluted salt water. The diluted salt water leaves the condensing chambers (157) through openings (203) in the gasket. It flows through holes (196) 1" (2.54 cm) in diameter in the sheets on its way out of the core. Barriers (202) prevent the diluted salt water from entering the boiling chambers. It passes through an opening (197) in the end plate (154), then enters a hose (198) which carries it to the heat exchanger, if a heat exchanger is in use.

Other Details of FIG. 12. The tiny sections of gasket in the central area of the sheets are spacers (204) to hold the sheets apart at any pressure from a complete vacuum to two atmospheres. Assembly holes (199) in the sheets and assembly holes (200) in the end plates are intended for bolts (not shown) to hold the core together.

Counterflow Heat Exchange. The power generation process may use the heat exchanger shown in FIG. 4. In this case the heat exchanger heats cold fresh water and cold salt water to temperatures near their boiling points by capturing heat from hot diluted salt water leaving the core. The liquids flow through their chambers with low velocities (less than 1 foot per second, or 0.3 meters per second), low pressure heads (less than 1 p.s.i. or 0.07 kg/sq cm), and laminar flow patterns. Instead of using a heat exchanger it would be possible to draw a vacuum on the core to boil the fresh water at ambient temperature.

Design Criteria for the Power Generator. Like all the other embodiments of the invention, the power generator is a form of heat exchanger. The most important aspect of its design is extensive surface area for heat exchange. The power generation embodiments supply at least two square feet of heat transfer surface area for every gallon of fresh water evaporated per hour (0.8 sq m/liter/hr). The embodiment shown in FIG. 12 supplies approximately three square feet of surface area per gallon per hour (1.2 sq m/liter/hr).

Performance Characteristics of the Power Generator. This power generator evaporates fifteen gallons (66 liters) of fresh water per hour. When distilled water feeds into the boiling chambers and concentrated brine feeds into the condensing chambers, a pressure difference of 4.5 p.s.i. (0.32 kg/sq cm) between the boiler and the condenser is created. It generates 750 watts of power, enough to supply electricity for the average residence.

Like the other embodiments of the invention, the power generator recycles energy efficiently with simple, easily manufactured hardware. By reducing the energy requirements of distillation and broadening the scope of its application, this invention will allow this ancient process to solve some of the most critical problems of contemporary human societies.

I claim the following inventions:

1. A method of producing a concentrate and a distillate from a given feed material which is at least in part liquid, said method comprising the steps of:
  (a) providing means for defining a vertically extending spiral-shaped boiling chamber and a vertically extending spiral-shaped condensing chamber on opposite sides of a vertically extending, spiral-shaped common plate member which includes, on one side thereof, a specific boiling surface within and forming part of said boiling chamber and, on the opposite side thereof, a condensing surface within and forming part of said condensing chamber and aligned with said boiling surface, said plate member being sufficiently thermally conductive and sufficiently thin in the area of said boiling and condensing surfaces to conduct heat across the two surfaces relatively efficiently;
  (b) directing a continuously replenished supply of said feed material into said boiling chamber so as to maintain said boiling chamber filled with said feed material to a level which entirely covers said boiling surface when said feed material is caused to boil and causing the feed material therein to boil, whereby it does so evenly over substantially the entire boiling surface of said plate member sufficient to produce vapor from some of the liquid of said feed material and to form a concentrate of the rest of the material;
  (c) continuously directing said concentrate, as it is formed, out of said boiling chamber and ultimately into a collection chamber and, at the same time, continuously directing said vapor, as it is formed, out of said boiling chamber and into said condensing chamber through a compression chamber where, by means of compression, the vapor is elevated in pressure by an amount not to exceed about two psi higher than the minimum required for condensation at atmospheric pressure;
  (d) as vapor continuously enters said condensing chamber from said compressing chamber, directing at least a portion thereof vertically downward uniformly and evenly across the entire condensing surface of said plate member so as to cause it to condense and form a distillate thereon and at the same time, transfer its heat of condensation across the plate member to said boiling surface for aiding in boiling the feed material at said boiling surface;
  (e) as said distillate forms on said condensing surface continuously directing it out of said condensing chamber;
  (f) wherein said means defining said boiling chamber includes a second vertically extending, spiral-shaped plate member defining a surface spaced a small distance from and in confronting relationship with said common plate member such that the two plate members define a vertically extending, laterally narrow boiling chamber, and wherein said step of continuously replenishing said boiling chamber with feed material includes the step of maintaining the liquid within said boiling chamber at a particular level from its bottom end to allow the liquid as it boils to boil from the bottom of the boiling chamber to its top end and therefore over the entire boiling surface.

2. A method of producing a concentrate and a distillate from a given feed material which is at least in part liquid, said method comprising the steps of:

(a) providing means for defining a plurality of alternating, directly adjacent vertically extending spiral shaped boiling and condensing chambers separated by vertically extending spiral shaped plate members, each of which includes on one side thereof a specific boiling surface within and defining one lateral boundary of a directly adjacent vertically extending, laterally narrow boiling chamber and on the opposite side thereof an aligned condensing surface within and defining one lateral boundary of a directly adjacent condensing chamber, each of said plate members being sufficiently thermally conductive and sufficiently thin in the area of its boiling and condensing surfaces to conduct heat across the two surfaces relatively efficiently;

(b) directing a continuously replenished supply of said feed material into each of said boiling chambers so as to maintain said boiling chamber filled with said feed material to a level which entirely covers said boiling surface when said feed material is caused to boil and causing the feed material therein to boil, whereby it does so uniformly and evenly over each of the entire boiling surfaces of each plate member sufficient to produce vapor from some of the liquid of said feed material within said boiling chambers and to form a concentrate of the rest of the material;

(c) continuously directing said concentrate, as it is formed, out of said boiling chambers and ultimately into a collection chamber and, at the same time, continuously directing said vapor, as it is formed, out of said boiling chambers and into said condensing chambers through a compression chamber where by means of compression, the vapor is elevated in pressure by an amount not to exceed about two psi higher than the minimum required for condensation at atmospheric pressure;

(d) as vapor continuously enters said condensing chambers from said compressing chamber, directing at least a portion thereof vertically downward uniformly and evenly across the entire condensing surfaces of said plate members so as to cause it to condense and form a distillate thereon and to transfer its heat of condensation across the plate members to said boiling surfaces for boiling the feed material at said boiling surface;

(e) as said distillate forms on said condensing surfaces continuously directing it out of said condensing chamber; and (f) wherein said step of continuously replenishing said boiling chambers with feed material includes the step of maintaining the liquid within said boiling chambers at a particular level from their bottom ends to allow the liquid as it boils to boil from the bottom of each boiling chamber to its top end and therefore over the entire boiling surfaces.

* * * * *